US009704161B1

(12) United States Patent
Oates et al.

(10) Patent No.: US 9,704,161 B1
(45) Date of Patent: Jul. 11, 2017

(54) PROVIDING INFORMATION WITHOUT AUTHENTICATION

(75) Inventors: Isaac Oates, Seattle, WA (US); Sherman Lo, Seattle, WA (US); Adam Ebel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 733 days.

(21) Appl. No.: 12/147,876

(22) Filed: Jun. 27, 2008

(51) Int. Cl.
*G06Q 20/38* (2012.01)
*G06Q 20/00* (2012.01)
*G06Q 20/22* (2012.01)
*G06Q 20/04* (2012.01)
*G06Q 20/08* (2012.01)
*G06Q 30/02* (2012.01)

(52) U.S. Cl.
CPC ........... *G06Q 20/385* (2013.01); *G06Q 20/00* (2013.01); *G06Q 20/04* (2013.01); *G06Q 20/08* (2013.01); *G06Q 20/22* (2013.01); *G06Q 20/38* (2013.01); *G06Q 20/387* (2013.01); *G06Q 30/02* (2013.01)

(58) Field of Classification Search
USPC ............................................. 705/25, 26, 64
See application file for complete search history.

(56) References Cited

U.S. PATENT DOCUMENTS

| 5,890,137 | A | | 3/1999 | Koreeda |
| 5,953,710 | A | * | 9/1999 | Fleming ................. G06Q 20/04 235/380 |
| 6,332,131 | B1 | | 12/2001 | Grandcolas et al. |
| 6,360,254 | B1 | * | 3/2002 | Linden .............. G06F 17/30876 707/E17.112 |
| 6,484,182 | B1 | * | 11/2002 | Dunphy ............ G06F 17/30958 700/231 |
| 6,636,242 | B2 | | 10/2003 | Bowman-Amuah |
| 6,658,568 | B1 | | 12/2003 | Ginter et al. |
| 6,661,431 | B1 | | 12/2003 | Stuart et al. |
| 6,853,987 | B1 | | 2/2005 | Cook |
| 6,856,966 | B1 | | 2/2005 | Fujimoto |
| 6,868,395 | B1 | | 3/2005 | Szlam et al. |
| 6,961,858 | B2 | * | 11/2005 | Fransdonk ............ G06F 21/10 380/281 |

(Continued)

FOREIGN PATENT DOCUMENTS

FR 2829647 3/2003

OTHER PUBLICATIONS

Kessler, "Passwords-Streghts and Weaknesses", retrived at <<http://www.garykessler.net/library/password.html>>, 1996, pp#1-pp#7.

(Continued)

*Primary Examiner* — Mamon Obeid
(74) *Attorney, Agent, or Firm* — Lee & Hayes, PLLC

(57) ABSTRACT

Techniques for providing information to a user without requiring the user to authenticate are described herein. In some instances, a user enters a payment identifier for the purpose of determining a fully-landed cost of one or more items. In response, a transaction processing service compares item details with information associated with the payment identifier and/or information about the owner of the identifier. The service may then provide this identifier-specific fully-landed cost to the user without requiring the user to authenticate or prove that she is the owner of the payment identifier.

26 Claims, 12 Drawing Sheets

(56) References Cited

U.S. PATENT DOCUMENTS

| | | | |
|---|---|---|---|
| 6,980,960 B2* | 12/2005 | Hajdukiewicz | G06Q 30/02 705/14.34 |
| 6,988,657 B1 | 1/2006 | Singer et al. | |
| 7,020,635 B2* | 3/2006 | Hamilton | G06Q 20/00 705/51 |
| 7,058,718 B2 | 6/2006 | Fontes et al. | |
| 7,073,129 B1 | 7/2006 | Robarts et al. | |
| 7,080,049 B2* | 7/2006 | Truitt | G06Q 20/16 380/30 |
| 7,089,497 B2 | 8/2006 | Abbott et al. | |
| 7,090,128 B2* | 8/2006 | Farley | H04L 67/2823 235/384 |
| 7,107,226 B1 | 9/2006 | Cassidy et al. | |
| 7,107,462 B2* | 9/2006 | Fransdonk | G06Q 20/12 380/282 |
| 7,117,165 B1 | 10/2006 | Adams et al. | |
| 7,136,841 B2 | 11/2006 | Cook | |
| 7,150,045 B2* | 12/2006 | Koelle | G06F 21/552 380/201 |
| 7,185,010 B2 | 2/2007 | Morinville | |
| 7,225,156 B2 | 5/2007 | Fisher et al. | |
| 7,319,986 B2 | 1/2008 | Praisner et al. | |
| 7,324,968 B2* | 1/2008 | Rotman | G06Q 10/08345 705/26.3 |
| 7,379,921 B1 | 5/2008 | Kiliccote | |
| 7,383,231 B2 | 6/2008 | Gupta et al. | |
| 7,434,723 B1 | 10/2008 | White et al. | |
| 7,478,331 B2 | 1/2009 | Abbott et al. | |
| 7,496,849 B2 | 2/2009 | Abbott et al. | |
| 7,552,365 B1 | 6/2009 | Marsh et al. | |
| 7,580,699 B1* | 8/2009 | Shaw | G06Q 20/102 455/410 |
| 7,587,502 B2* | 9/2009 | Crawford | A63F 13/12 463/42 |
| 7,676,407 B2 | 3/2010 | Van De Van et al. | |
| 7,685,013 B2 | 3/2010 | Gendler | |
| 7,711,586 B2* | 5/2010 | Aggarwal | G06Q 10/02 700/14 |
| 7,729,994 B2 | 6/2010 | Gupta et al. | |
| 7,748,614 B2 | 7/2010 | Brown | |
| 7,809,819 B2 | 10/2010 | DeLima et al. | |
| 7,827,101 B2 | 11/2010 | Mascavage, III | |
| 7,917,160 B2 | 3/2011 | Choe et al. | |
| 8,027,918 B2 | 9/2011 | Nielsen et al. | |
| 8,046,256 B2 | 10/2011 | Chien et al. | |
| 8,150,768 B2 | 4/2012 | Gupta et al. | |
| 8,195,576 B1* | 6/2012 | Grigg | G06Q 20/20 380/229 |
| 8,249,988 B2 | 8/2012 | Teicher | |
| 8,271,395 B2 | 9/2012 | Dominguez et al. | |
| 8,389,140 B2 | 3/2013 | Yu et al. | |
| 8,636,206 B2* | 1/2014 | Rothwell | G06Q 20/20 235/380 |
| 8,706,631 B2 | 4/2014 | Gupta | |
| 8,768,838 B1* | 7/2014 | Hoffman | G06Q 40/00 705/44 |
| 8,788,945 B1* | 7/2014 | Jesensky | G06Q 20/40 705/35 |
| 9,059,643 B2 | 6/2015 | Haddad | |
| 9,123,069 B1* | 9/2015 | Haynes | G06Q 30/0625 |
| 9,449,319 B1* | 9/2016 | Agarwal | G06Q 20/382 |
| 9,576,288 B1* | 2/2017 | Jesensky | G06Q 30/06 |
| 2001/0034724 A1 | 10/2001 | Thieme | |
| 2001/0044756 A1 | 11/2001 | Watkins et al. | |
| 2002/0007351 A1* | 1/2002 | Hillegass | G06Q 20/06 705/59 |
| 2002/0032605 A1* | 3/2002 | Lee | G06Q 20/10 705/51 |
| 2002/0046169 A1* | 4/2002 | Keresman, III | G06Q 20/04 705/41 |
| 2002/0046191 A1 | 4/2002 | Joao | |
| 2002/0087477 A1* | 7/2002 | Mantena | G06Q 10/087 705/64 |
| 2002/0103752 A1 | 8/2002 | Berger et al. | |
| 2002/0112171 A1* | 8/2002 | Ginter | G06F 21/00 713/185 |
| 2002/0120567 A1 | 8/2002 | Caplan et al. | |
| 2002/0138366 A1* | 9/2002 | Skantze | G06Q 30/02 705/26.43 |
| 2002/0174030 A1 | 11/2002 | Praisner et al. | |
| 2002/0175517 A1 | 11/2002 | Anderson | |
| 2002/0194138 A1 | 12/2002 | Dominguez et al. | |
| 2003/0004831 A1 | 1/2003 | Owens | |
| 2003/0046172 A1 | 3/2003 | Himmel et al. | |
| 2003/0061170 A1 | 3/2003 | Uzo | |
| 2003/0083983 A1 | 5/2003 | Fisher et al. | |
| 2003/0105682 A1 | 6/2003 | Dicker et al. | |
| 2003/0126018 A1* | 7/2003 | LaMotta | G06Q 20/207 705/19 |
| 2003/0126094 A1 | 7/2003 | Fisher et al. | |
| 2003/0135625 A1 | 7/2003 | Fontes et al. | |
| 2003/0139971 A1 | 7/2003 | Rescigno et al. | |
| 2003/0173407 A1* | 9/2003 | Anton | G06Q 20/3433 235/492 |
| 2003/0177361 A1* | 9/2003 | Wheeler | G06F 21/32 713/176 |
| 2003/0220875 A1 | 11/2003 | Lam et al. | |
| 2004/0111370 A1 | 6/2004 | Saylors et al. | |
| 2004/0128211 A1 | 7/2004 | Tsai | |
| 2004/0139004 A1* | 7/2004 | Cohen | G06Q 20/02 705/39 |
| 2004/0143547 A1 | 7/2004 | Mersky | |
| 2004/0198308 A1 | 10/2004 | Hurst et al. | |
| 2004/0225606 A1 | 11/2004 | Nguyen et al. | |
| 2004/0267672 A1* | 12/2004 | Gray | G06Q 20/04 705/65 |
| 2005/0027639 A1 | 2/2005 | Wong | |
| 2005/0097037 A1* | 5/2005 | Tibor | G06K 9/00006 705/39 |
| 2005/0108153 A1 | 5/2005 | Thomas et al. | |
| 2005/0114666 A1 | 5/2005 | Sudia | |
| 2005/0125317 A1 | 6/2005 | Winkelman, III et al. | |
| 2005/0149439 A1* | 7/2005 | Suisa | G06Q 20/04 705/44 |
| 2005/0154744 A1 | 7/2005 | Morinville | |
| 2005/0166265 A1* | 7/2005 | Satomi | G06F 21/31 726/21 |
| 2005/0167489 A1 | 8/2005 | Barton et al. | |
| 2005/0198534 A1 | 9/2005 | Matta et al. | |
| 2005/0240493 A1 | 10/2005 | Johnson et al. | |
| 2005/0251447 A1* | 11/2005 | Lane | G06Q 30/02 705/14.11 |
| 2005/0278222 A1 | 12/2005 | Nortrup | |
| 2005/0278263 A1 | 12/2005 | Hollander et al. | |
| 2006/0015458 A1 | 1/2006 | Teicher | |
| 2006/0015463 A1 | 1/2006 | Gupta et al. | |
| 2006/0069654 A1* | 3/2006 | Beach | G06Q 20/367 705/65 |
| 2006/0080238 A1 | 4/2006 | Nielsen et al. | |
| 2006/0111967 A1* | 5/2006 | Forbes | G06Q 30/02 705/14.26 |
| 2006/0136309 A1 | 6/2006 | Horn et al. | |
| 2006/0212392 A1 | 9/2006 | Brown | |
| 2006/0212393 A1 | 9/2006 | Lindsay Brown | |
| 2006/0213983 A1* | 9/2006 | Walker | G06Q 20/04 235/380 |
| 2006/0219776 A1 | 10/2006 | Finn | |
| 2006/0248452 A1 | 11/2006 | Lambert et al. | |
| 2006/0265489 A1 | 11/2006 | Moore | |
| 2006/0271476 A1* | 11/2006 | Thompson | G06Q 20/02 705/39 |
| 2006/0277474 A1 | 12/2006 | Robarts et al. | |
| 2007/0005495 A1 | 1/2007 | Kim | |
| 2007/0073630 A1 | 3/2007 | Greene et al. | |
| 2007/0078760 A1 | 4/2007 | Conaty et al. | |
| 2007/0083433 A1* | 4/2007 | Lawe | G06F 21/552 380/201 |
| 2007/0106606 A1 | 5/2007 | Pankratz et al. | |
| 2007/0150299 A1 | 6/2007 | Flory | |
| 2007/0157110 A1 | 7/2007 | Gandhi et al. | |

(56) References Cited

U.S. PATENT DOCUMENTS

| | | | |
|---|---|---|---|
| 2007/0158413 A1* | 7/2007 | Hastie | G06Q 30/06 235/380 |
| 2007/0179790 A1 | 8/2007 | Leitch et al. | |
| 2007/0192245 A1 | 8/2007 | Fisher et al. | |
| 2007/0198432 A1* | 8/2007 | Pitroda | G06Q 30/02 705/14.26 |
| 2007/0226084 A1* | 9/2007 | Cowles | G06Q 20/02 705/64 |
| 2007/0233579 A1* | 10/2007 | Saarinen | G06Q 30/0601 705/26.8 |
| 2007/0283273 A1 | 12/2007 | Woods | |
| 2007/0288364 A1 | 12/2007 | Gendler | |
| 2007/0288370 A1 | 12/2007 | Konja | |
| 2007/0299736 A1 | 12/2007 | Perrochon et al. | |
| 2008/0015927 A1* | 1/2008 | Ramirez | G06Q 30/06 705/26.62 |
| 2008/0033878 A1 | 2/2008 | Krikorian et al. | |
| 2008/0052226 A1* | 2/2008 | Agarwal | G06F 17/277 705/39 |
| 2008/0052343 A1 | 2/2008 | Wood | |
| 2008/0097933 A1* | 4/2008 | Awaida | G06F 17/277 705/39 |
| 2008/0114709 A1 | 5/2008 | Dixon et al. | |
| 2008/0134043 A1 | 6/2008 | Georgis et al. | |
| 2008/0140524 A1 | 6/2008 | Anand et al. | |
| 2008/0140564 A1 | 6/2008 | Tal et al. | |
| 2008/0147506 A1* | 6/2008 | Ling | G06Q 30/0283 705/400 |
| 2008/0168543 A1* | 7/2008 | von Krogh | G06F 21/34 726/6 |
| 2008/0168544 A1* | 7/2008 | von Krogh | G06Q 20/04 705/14.27 |
| 2008/0172270 A1 | 7/2008 | Eckenroth | |
| 2008/0177663 A1 | 7/2008 | Gupta et al. | |
| 2008/0183574 A1 | 7/2008 | Nash et al. | |
| 2008/0183757 A1 | 7/2008 | Dorogusker et al. | |
| 2008/0189186 A1 | 8/2008 | Choi et al. | |
| 2008/0195506 A1 | 8/2008 | Koretz et al. | |
| 2008/0201643 A1 | 8/2008 | Nagaitis et al. | |
| 2008/0208747 A1* | 8/2008 | Papismedov | G06Q 20/20 705/44 |
| 2008/0221987 A1 | 9/2008 | Sundaresan et al. | |
| 2008/0270293 A1 | 10/2008 | Fortune et al. | |
| 2008/0275777 A1 | 11/2008 | Protheroe et al. | |
| 2008/0320147 A1 | 12/2008 | DeLima et al. | |
| 2009/0006995 A1 | 1/2009 | Error et al. | |
| 2009/0024469 A1 | 1/2009 | Broder et al. | |
| 2009/0037294 A1 | 2/2009 | Malhotra | |
| 2009/0132969 A1 | 5/2009 | Mayer | |
| 2009/0138379 A1* | 5/2009 | Scheman | 705/27 |
| 2009/0164442 A1 | 6/2009 | Shani et al. | |
| 2009/0172551 A1 | 7/2009 | Kane et al. | |
| 2009/0241015 A1 | 9/2009 | Bender et al. | |
| 2009/0248467 A1 | 10/2009 | Bulman et al. | |
| 2009/0259559 A1* | 10/2009 | Carroll | G06Q 20/20 705/17 |
| 2009/0259574 A1 | 10/2009 | Thomsen et al. | |
| 2009/0307134 A1 | 12/2009 | Gupta et al. | |
| 2010/0049766 A1 | 2/2010 | Sweeney et al. | |
| 2010/0095216 A1* | 4/2010 | Morse | G06Q 20/02 715/738 |
| 2010/0121734 A1* | 5/2010 | Harper | G06Q 20/12 705/26.1 |
| 2010/0138297 A1 | 6/2010 | Fitzgerald et al. | |
| 2010/0197380 A1 | 8/2010 | Shackleton | |
| 2010/0293048 A1 | 11/2010 | Singolda et al. | |
| 2010/0299731 A1 | 11/2010 | Atkinson | |
| 2010/0306078 A1* | 12/2010 | Hwang | G06Q 30/02 705/26.1 |
| 2011/0035289 A1* | 2/2011 | King | G06Q 30/0277 705/14.73 |
| 2011/0060629 A1* | 3/2011 | Yoder | G06Q 20/02 705/14.1 |
| 2011/0117935 A1 | 5/2011 | Cho et al. | |
| 2012/0316992 A1* | 12/2012 | Oborne | G06Q 30/06 705/26.41 |
| 2013/0074168 A1 | 3/2013 | Hao et al. | |
| 2013/0124364 A1* | 5/2013 | Mittal | G06Q 20/385 705/26.41 |
| 2013/0136242 A1 | 5/2013 | Ross et al. | |
| 2013/0151417 A1* | 6/2013 | Gupta | G06Q 20/382 705/65 |
| 2013/0198084 A1* | 8/2013 | Agarwal | G06F 17/277 705/44 |
| 2013/0268437 A1* | 10/2013 | Desai | G06Q 20/08 705/41 |
| 2013/0290203 A1* | 10/2013 | Purves | G06Q 50/01 705/319 |
| 2014/0019352 A1* | 1/2014 | Shrivastava | G06Q 20/3674 705/41 |
| 2014/0082071 A1* | 3/2014 | Rexer | H04L 29/08666 709/204 |
| 2014/0089113 A1* | 3/2014 | Desai | G06Q 20/322 705/16 |
| 2014/0180909 A1* | 6/2014 | Gillett | G06Q 20/12 705/39 |
| 2014/0281853 A1 | 9/2014 | Bender et al. | |
| 2014/0297533 A1* | 10/2014 | Mittal | G06Q 20/325 705/44 |
| 2015/0006426 A1* | 1/2015 | Sobhani | G06Q 20/06 705/329 |
| 2015/0026062 A1* | 1/2015 | Paulsen | G06Q 30/0279 705/44 |
| 2015/0278901 A1* | 10/2015 | Windemuth | G06F 19/324 705/26.5 |
| 2015/0302398 A1* | 10/2015 | Desai | G06F 8/60 705/41 |
| 2016/0036801 A1* | 2/2016 | Caldwell | H04L 63/08 726/6 |
| 2016/0071087 A1* | 3/2016 | Mittal | G06Q 20/325 705/44 |

OTHER PUBLICATIONS

Office action for U.S. Appl. 12/165,102, mailed on Apr. 1, 2011, Jesensky, James, "Automatic Approval".

U.S. Appl. No. 11/771,679, filed Jun. 29, 2007, Maynard-Zhang, et al., "Mapping Attributes to Network Addresses.".

"PayPal Security Key", retrieved on Jun. 19, 2008 at <<https://www.paypal.com/securitykey>>, PayPal (2 pages).

Quova, retrieved on May 29, 2009 at <<http://www.quova.com/>>, Quova Inc., USA, 5 pgs.

Fielding et al, "Hypertext Transfer Protocol—HTTP/1.1", Network Working Group, W3C/MIT, Jun. 1999, http://tools.ietf.org/pdf/rfc2616.pdf, 114 pages.

Howstuffworks, "What is a packet?", http"//web.archive.org/web/20060708154355/http://computer.howstuffworks.com/question525.htm, last retrieved Sep. 1, 2011, 2 pages.

Final Office Action for U.S. Appl. No. 12/035,618, mailed on Aug. 2, 2011, Michel Bryc, "Automated Targeting of Content Components" 39 pages.

Final Office Action for U.S. Appl. No. 12/165,102, mailed on Sep. 13, 2011, James Jesensky, "Automatic Approval", 31 pages.

Wikipedia, HTTP cookie, "http://web.archive.org/web/20080227064831/http://en.wikipedia.org/wiki/HTTP_cookie", last retrieved Sep. 1, 2011, 18 pages.

Wikipedia, MSISDN, http://web/archive.org/web/20071029015418/http://en.wikipeida.org/wiki/MSISDN, last retrieved Sep. 1, 2011, 3 pages.

Apache HBase, Chapter 8 Architecture, retrieved from <<http://hbase.apache.org/book.html#architecture>>, available as early as Nov. 30, 2011, Apache Software Foundation, 8 pages.

Chang et al, "Bigtable: A Distributed Storage System for Structured Data," 7th USENIX Symposium on Operating Systems Design and Implementation, OSDI '06, Nov. 2006, 14 pages.

Non-Final Office Action for U.S. Appl. No. 12/165,102, mailed on Mar. 8, 2012, James Jesensky et al., "Automatic Approval", 31 pages.

(56) References Cited

OTHER PUBLICATIONS

Non-Final Office Action for U.S. Appl. No. 12/165,102, mailed on Jul. 3, 2012, Jesensky James et al., "Automatic Approval", 30 pages.

Non-Final Office Action for U.S. Appl. No. 12/035,618, mailed on Apr. 14, 2012, Michel Bryc et al., "Automated Targeting of Content Components", 31 pages.

Office Action for U.S. Appl. No. 12/544,940, mailed on Jun. 11, 2014, Matthew T. Williams, "Providing Localized Delivery Information Without Authentication", 15 pages.

Office action for U.S. Appl. No. 12/165,081, mailed on Jul. 25, 2014, Agarwal et al., "Conducting Transactions with Dynamic Passwords", 8 pages.

Office action for U.S. Appl. No. 12/165,081, mailed on Oct. 17, 2012, Agarwal et al., "Conducting Transactions with Dynamic Password", 25 pages Final Office Action for U.S. Appl. No. 12/035,618, mailed on Oct. 22, 2012, Michal Bryc et al., "Automated Targeting of Content Components", 39 pages.

Office action for U.S. Appl. No. 12/165,102, mailed on Nov. 9, 2012, Jesensky et al., "Automatic Approval", 36 pages.

Non-Final Office Action for U.S. Appl. No. 12/035,618, mailed on Apr. 17, 2012, Michal Bryc et al., "Automated Targeting of Content Components", 31 pages.

Non-Final Office Action for U.S. Appl. No. 12/165,081, mailed on Jun. 4, 2012, Amit Agarwal et al., "Conducting Transactions with Dynamic Passwords", 23 pages.

Final Office Action for U.S. Appl. No. 12/165,081, mailed on Nov. 14, 2014, Amit Agarwal, "Conducting Transactions with Dynamic Passwords", 8 pages.

Office Action for U.S. Appl. No. 12/544,940, mailed on Nov. 17, 2014, Matthew T. Williams, "Providing Localized Delivery Information Without Authentication", 15 pages.

Final Office Action for U.S. Appl. No. 12/165,102, mailed on Nov. 8, 2013, James Jesensky, "Automatic Approval", 37 pages.

Office Action for U.S. Appl. No. 12/165,081, mailed on Nov. 20, 2013, Amit Agarwal, "Conducting Transactions with Dynamic Passwords", 25 pages.

Final Office Action for U.S. Appl. No. 12/544,940, mailed on May 19, 2015, Matthew T. Williams, "Providing Localized Delivery Information Without Authentication", 16 pages.

Office Action for U.S. Appl. No. 12/165,081 mailed on Nov. 18, 2015, Agarwal et al., "Conducting Transactions with Dynamic Passwords", 18 pages.

Office Action for U.S. Appl. No. 12/544,940, mailed on Mar. 24, 2016, Williams et al., "Providing Localized Delivery Information Without Authentication", 10 pages.

Office Action for U.S. Appl. No. 14/336,258, mailed on May 19, 2016, Jesensky et al., "Automatic Approval", 32 pages.

Office action for U.S. Appl. No. 12/165,102, mailed on May 17, 2013, Jesensky et al, "Automatic Approval", 42 pages.

\* cited by examiner

PROVIDING INFORMATION WITHOUT AUTHENTICATION

BACKGROUND

Companies utilizing e-commerce sites strive to make their sites easier for users to locate and purchase items. To help users locate items, for instance, these sites may categorize products into varying categories of an electronic catalog. These sites may also allow users to assign "tags" to the items, which other users may then use as search terms when attempting to locate an item. In order to ease users' ability to purchase items, meanwhile, these companies may configure their sites to accept many forms of payment. While many of these strategies have increased the effectiveness of these sites, companies continually strive to further enhance user experiences on these and many other types of sites.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
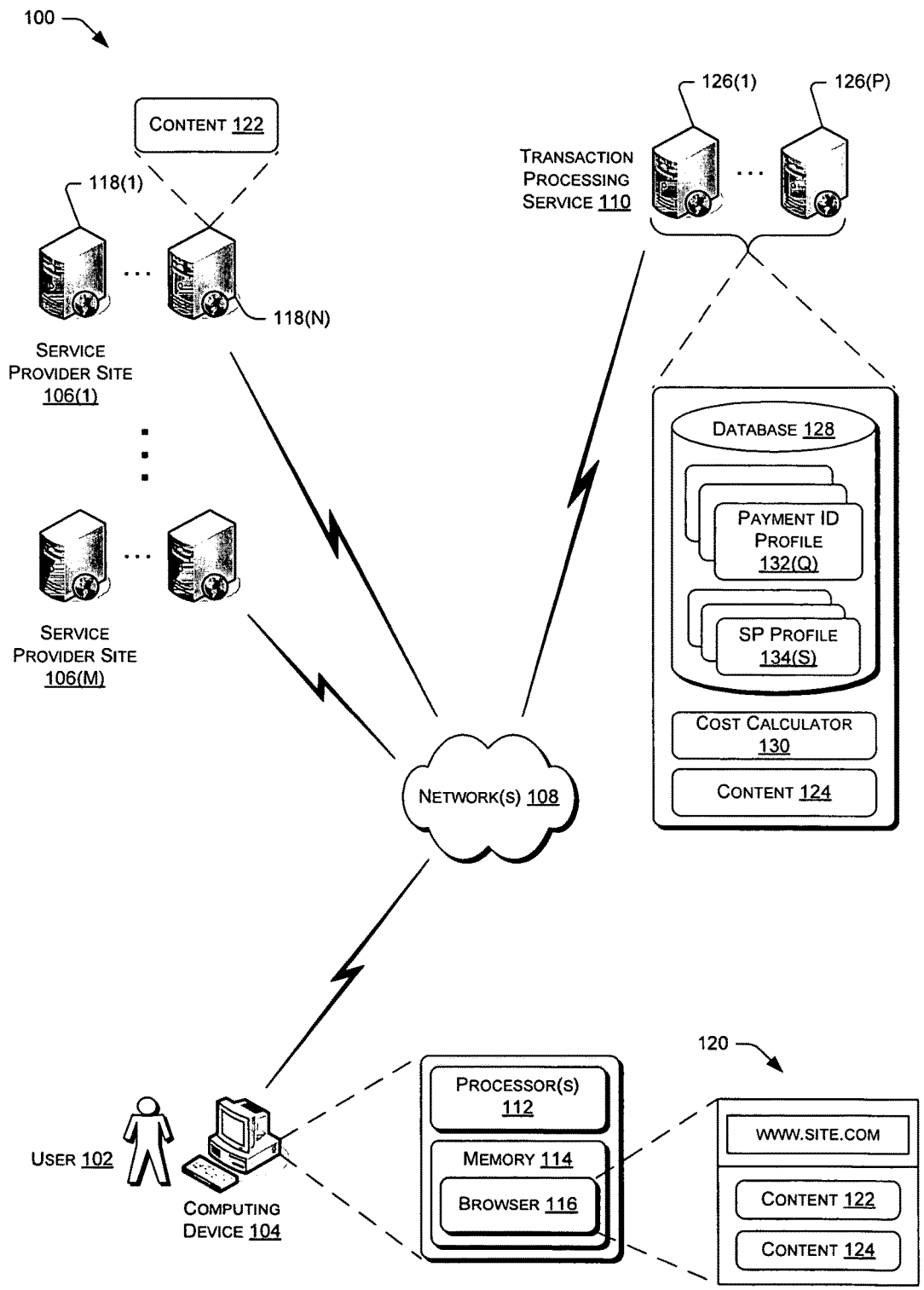
FIG. 1 illustrates an example architecture for providing information to a user or other entity without requiring authentication. This example architecture illustrates a user operating a computing device to access a site of a service provider to engage in a transaction with the provider. The service provider may leverage a transaction processing service for processing the transaction. In some instances, this service outputs a fully-landed cost for an item. This cost may be specific to the payment identifier used and may be provided even before the illustrated user authenticates herself or the identifier.

This disclosure is directed to, in part, providing information that is user-specific or account-specific without requiring the user to authenticate. For instance, a user may provide a payment identifier to an entity for the purpose of determining a "fully-landed cost" of a particular item. The fully-landed cost may comprise the total cost of item, including tax, shipping, any available promotions, and the like. The user may receive this fully-landed cost without having authenticated—or, in other words, without having proven that the user actually owns or has the authority to use this payment identifier. Of course, if the user wishes to actually purchase the item with the payment identifier (after the fully-landed cost has been provided), then the user may need to authenticate his or herself at this time. Nevertheless, providing the fully-landed cost simply in response to the user providing a payment identifier enhances the user experience by allowing the user to quickly determine a total cost of a transaction.

In addition to providing a fully-landed cost to a user, the described techniques may provide other types of information without requiring user authentication. For instance, envision that a user wishes to view an electronic document that is only accessible for certain types of users (e.g., board-certified doctors). The user may enter a payment identifier, which may be provided to a transaction processing service or another entity. In response, the service or entity may determine whether an owner of the identifier meets the requirements for viewing the electronic document. If so, then the service or entity may indicate that the user would indeed be able to view the document with the provided identifier, if the user were to authenticate his or herself. Conversely, if the service or entity determines that the user could not access the document with the provided identifier, then the user may be so informed.

While two examples have been given, the reader will appreciate that the following discussion makes clear that the claimed techniques may be implemented in many other contexts. In each context, user-specific or account-specific information is made available without requiring the identifier-providing user to authenticate.

The discussion begins with a section entitled "Illustrative Architecture", which describes one non-limiting environment that may implement the claimed techniques. A section entitled "Illustrative User Interfaces" follows. This section depicts and describes illustrative examples of user interfaces (UIs) that may be served to and rendered at the device of the user of FIG. 1. A third section, entitled "Illustrative Flow Diagram", depicts and describes how the claimed techniques may be employed in the illustrative architecture of FIG. 1, as well as other architectures. Finally, a section entitled "Illustrative Processes" concludes the discussion.

This brief introduction, including section titles and corresponding summaries, is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. However, while the following implementation is described in the context of calculating and providing a fully-landed cost of one or more items, it is to be appreciated that this following implementation and context is but one of many.

Illustrative Architecture

FIG. 1 illustrates an example architecture 100 in which the claimed techniques may be implemented. Here, the techniques are described in the context of a user 102 operating a computing device 104 to access one or more service provider sites 106(1), . . . , (M) over a network 108. For instance, user 102 may employ device 104 to access service provider site 106(1) for purposes of engaging in a transaction with the service provider. While architecture 100 illustrates sites 106(1)-(M), the described techniques may apply equally to service providers that additionally or alternatively comprise brick-and-mortar service providers.

Architecture 100 also includes a transaction processing service 110 configured to manage the requested transaction. While service provider site 106(1) and transaction processing service 110 are illustrated in the current example as separate entities, it is to be appreciated that service provider site 106(1) and processing service 110 may comprise the same entity or may employ similar or the same functionality in other embodiments. Furthermore, it is to be appreciated that the described techniques themselves may be implemented in a vast number of other environments and architectures.

In architecture 100, service provider site 106(1) may comprise any sort of site that supports user interaction, including social networking sites, e-commerce sites, informational sites, news and entertainment sites, and so forth. Additionally, the site is representative of proprietary sites that receive requests and provide content over proprietary networks other than the Internet and public web.

Furthermore, while the illustrated example represents user 102 accessing service provider site 106(1), the described techniques may equally apply in instances where user 102 interacts with the service provider over the phone, via a kiosk, or in any other manner. It is also noted that the described techniques may apply in other client/server arrangements, as well as in non-client/server arrangements (e.g., locally-stored software applications, set-top boxes, etc.).

Here, user 102 accesses content site 106(1) via network 108. Network 108 may include any one or combination of multiple different types of networks, such as cable networks, the Internet, and wireless networks. User computing device 104, meanwhile, may be implemented as any number of computing devices, including as a personal computer, a laptop computer, a portable digital assistant (PDA), a cell phone, a set-top box, a game console, a personal media player (PMP), and so forth. User computing device 104 is equipped with one or more processors 112 and memory 114 to store applications and data. An application, such as browser 116 or other client application, running on device 104 facilitates access to service provider site 106(1) over network 108.

Site 106(1) is hosted on one or more servers 118(1), . . . , 118(N) having processing and storage capabilities. In one implementation, the servers might be arranged in a cluster or as a server farm, although other server architectures may also be used to host the site. The site is capable of handling requests from many users and serving, in response, various pages of content that can be rendered at user computing device 104 for viewing by user 102. For instance and as illustrated, site 106(1) may serve a page 120 to computing device 104. Page 120 may comprise any sort of content, such as an item for sale, a user profile, a search page, a discussion forum, and/or any other type of page.

In the illustrated example, page 120 comprises content 122 served by service provider site 106(1), as well as content 124 served by transaction processing service 110. Here, content 122 and 124 may comprise any sort of content capable of being visually, audibly, or otherwise consumed by user 102. In instances where service provider site 106(1) comprises an e-commerce site, content 122 may comprise one or more items for consumption by user 102. For example, this content may comprise an item for sale, rent, download, viewing, listening, or for any other type of consumption.

Figure 3:
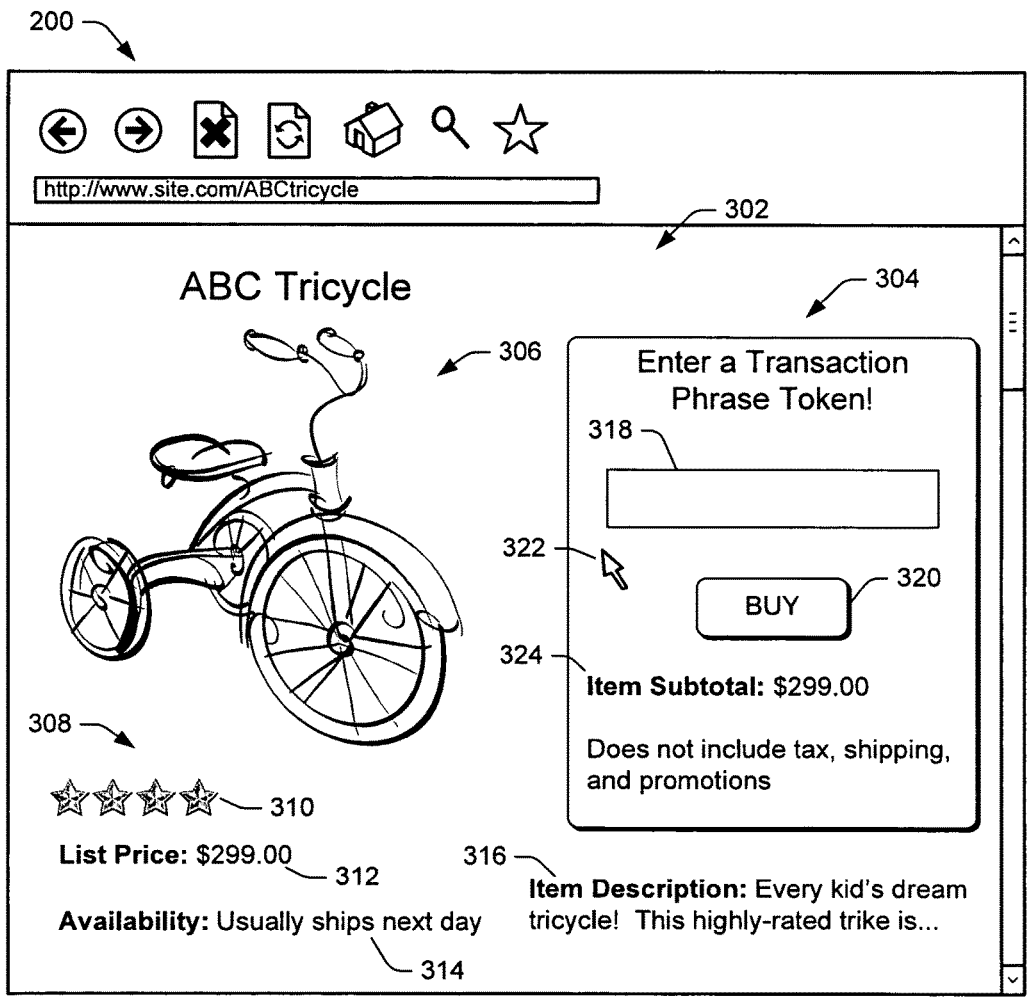
FIG. 3 illustrates an example screen rendering of a page served by the service provider of FIG. 1. Here, the example page includes a widget provided by the transaction processing service of FIG. 1. The widget allows the user to enter a payment identifier for the purpose of requesting to purchase the illustrated item.

Content 124, meanwhile, may comprise content that enables user 102 to enter into a transaction with the service provider hosting site 106(1). In instances where site 106(1) comprises an e-commerce site, for example, content 124 may comprise a widget that allows user 102 to enter into a transaction with the service provider to consume or obtain content 122. FIG. 3 illustrates an example of content 122 and 124, and is discussed in detail below.

As illustrated, transaction processing service 110 may be hosted by one or more servers 126(1), . . . , (P). Servers 126(1)-(P) store or have access to content 124, as well as a database 128 and a cost calculator 130. Database 128 stores or otherwise has access to one or more payment identifier profiles 132(1), . . . , (Q). Each of profiles 132(1)-(Q) is associated with a respective payment identifier of a user that employs transaction processing service 110 for the purpose of engaging in transactions with service providers. These payment identifiers may include, without limitation, credit card numbers, bank account numbers, gift card numbers, lines of credit, and/or any other instrument that may be used to conduct a transaction with a service provider.

Additionally, one or more of the payment identifiers may or may not identify the payment instrument that is associated with the identifier. For instance, while a payment identifier such as a credit card number may identify the payment instrument (i.e., the credit card), other payment identifiers may not. For instance, some other payment identifiers may comprise transaction phrase tokens, which may be free from information identifying the actual payment instrument that is linked with the phrase token.

As described in U.S. Provisional Application No. 60/823,611, filed on Aug. 25, 2006, and U.S. patent application Ser. No. 11/548,111, filed on Oct. 10, 2006, both entitled UTILIZING PHRASE TOKENS IN TRANSACTIONS and both incorporated herein by reference, a transaction phrase token may comprise a set of characters that has a secondary meaning to user 102 or to a user associated with a transaction phase token. In addition to comprising a phrase of alphanumeric characters (e.g., "Ride On", "J's Spending $", etc.), the transaction phrase token may also take the form of a physical card (e.g., similar in size and shape to a credit card). Whatever its form, the transaction phrase token may link to a transaction account or payment instrument, such as a bank account or a credit card. For example, a transaction phrase token associated with user 102 may link with a payment instrument (e.g., a bank account) of user 102 or some other person or entity. Therefore, user 102 (and potentially one or more other users) may employ this transaction phrase token as a payment method for future purchases.

Furthermore, transaction phrase tokens may be associated with certain rules that dictate when and how a user may employ a transaction phrase token for purchases. Similarly, the user that controls use of the transaction phrase token (e.g., the person associated with the underlying transaction account or payment instrument) may differ from a user of the token. For instance, a mother may create a token for her daughter ("Grace") entitled "Grace's Textbooks". Once the mother creates or approves creation of the token, Grace may then specify this token as a payment method. By identifying this token as a payment method, the daughter thus identifies the mother (i.e., the person associated with the linked transaction account or payment instrument) as the payer for these purchases.

Again, this transaction phrase token may be associated with predefined rules. For instance, the mother may create a rule that pre-approves purchases of certain textbooks. The mother may also employ other rules, such as dollar amounts, time limits, and the like. In these instances, when the daughter employs the token as a payment method, the transaction processing service 110 may compare the requested purchase with the rules associated with the token. The service may then complete or cancel the requested purchase according to the token's rules. Conversely or additionally, service 110 may notify the owner of the token (here, the mother) to request that the owner of the token approve or deny the requested purchase.

Each of identifier profiles 132(1)-(Q) may store information and settings associated with each payment identifier. For instance, a particular profile 132(Q) may store a name of an identifier, an underlying transaction account or payment instrument if the identifier comprises a transaction phrase token, an owner of or user associated with the identifier, a shipping and/or billing address of the identifier, a payment method (e.g. a specific credit card, among other possibilities) and potentially many other options and settings. Identifier profiles 132(1)-(Q) are discussed in more detail below with reference to FIG. 2.

In addition to identifier profiles 132(1)-(Q), database 128 stores or has access to one or more service provider profiles 134(1), . . . , (S). Each of profiles 134(1)-(S) may correspond to a respective service provider, each of which may or may not host one of sites 106(1)-(M). Each of service provider profiles 134(1)-(S) comprises varying information about the respective service provider. This information may include, for example, costs of items offered for consumption by the service provider (e.g., sale, download, rent, etc.), shipping costs of the items, promotion information, and the like. Again, FIG. 2 and an accompanying discussion illustrate and describe profiles 132(1)-(S) in more detail.

Database 128 further stores or has access to cost calculator 130. In some instances, cost calculator 130 functions to receive a payment identifier from a user along with details about a particular item or items offered for consumption by a service provider, such as service provider site 106(1). In response, cost calculator 130 may analyze a corresponding identifier profile associated with the received payment identifier, as well as a corresponding service provider profile associated with site 106(1).

Cost calculator 130 may then compare some or all of this information with one another. For instance, calculator 130 may compare item details with the identifier profile. In instances where the payment identifier profile prescribes certain rules limiting the type or amount of a transaction, calculator 130 may determine whether or not the item or items may be purchased at all with the received payment identifier. If not, then cost calculator 130 (and, hence, service 110) may provide an indication to device 104 that the transaction will not be allowed with the received payment identifier. Note that service 110 may provide this information even before user 102 has authenticated his or herself. That is, service 110 may provide this information regardless of whether or not user 102 is the owner of or user associated with the received payment identifier.

If calculator 130 determines that the identifier profile will allow the transaction, then calculator 130 may compare information from the identifier profile with information from the service provider profile, as well as information from the identifier profile. In some instances, calculator 130 makes this comparison for the purpose of determining a fully-landed cost of the subject item or items. For instance, calculator 130 may determine a shipping address associated with the received payment identifier. Calculator 130 may then analyze shipping costs provided by the service provider (and stored in the service provider profile) for the purpose of determining a cost of shipping the item(s) to the shipping address associated with the received token. Calculator 130 may then calculate the cost of shipping the item if the item were purchased with the received payment identifier.

Furthermore, calculator 130 may use information associated with the received payment identifier, such as a billing address, to determine tax-rate information provided by the service provider profile. Based at least in part on this comparison, calculator 130 may calculate a sales tax for the item if the item were to be purchased with the received payment identifier. Calculator 130 may also determine whether any promotions or discounts would apply if the item were purchased with the payment identifier. In some cases, if a token specifies that items bought with the token should be gift wrapped, calculator 130 may also add any gift wrap fees that are applicable if the item were to be purchased with the received payment identifier. These and other illustrative calculations are described in detail below.

Based on these comparisons, calculator 130 calculates a fully-landed cost for an item or items if the item(s) were to be purchased with the received payment identifier. Calculator 130 may then make this cost available to computing device 104, service provider site 106(1), and/or to one or more other entities. In some instances, service 110 sends this fully-landed cost to device 104 for rendering on browser 116. Here, user 102 is able to view a fully-landed cost for one or more items merely by providing a payment identifier and without proving that he or she actually owns the payment identifier. Of course, if user 102 wishes to actually purchase the item with the payment identifier, then service 110 may require that user 102 authenticate his or herself before completing the transaction.

Figure 2:
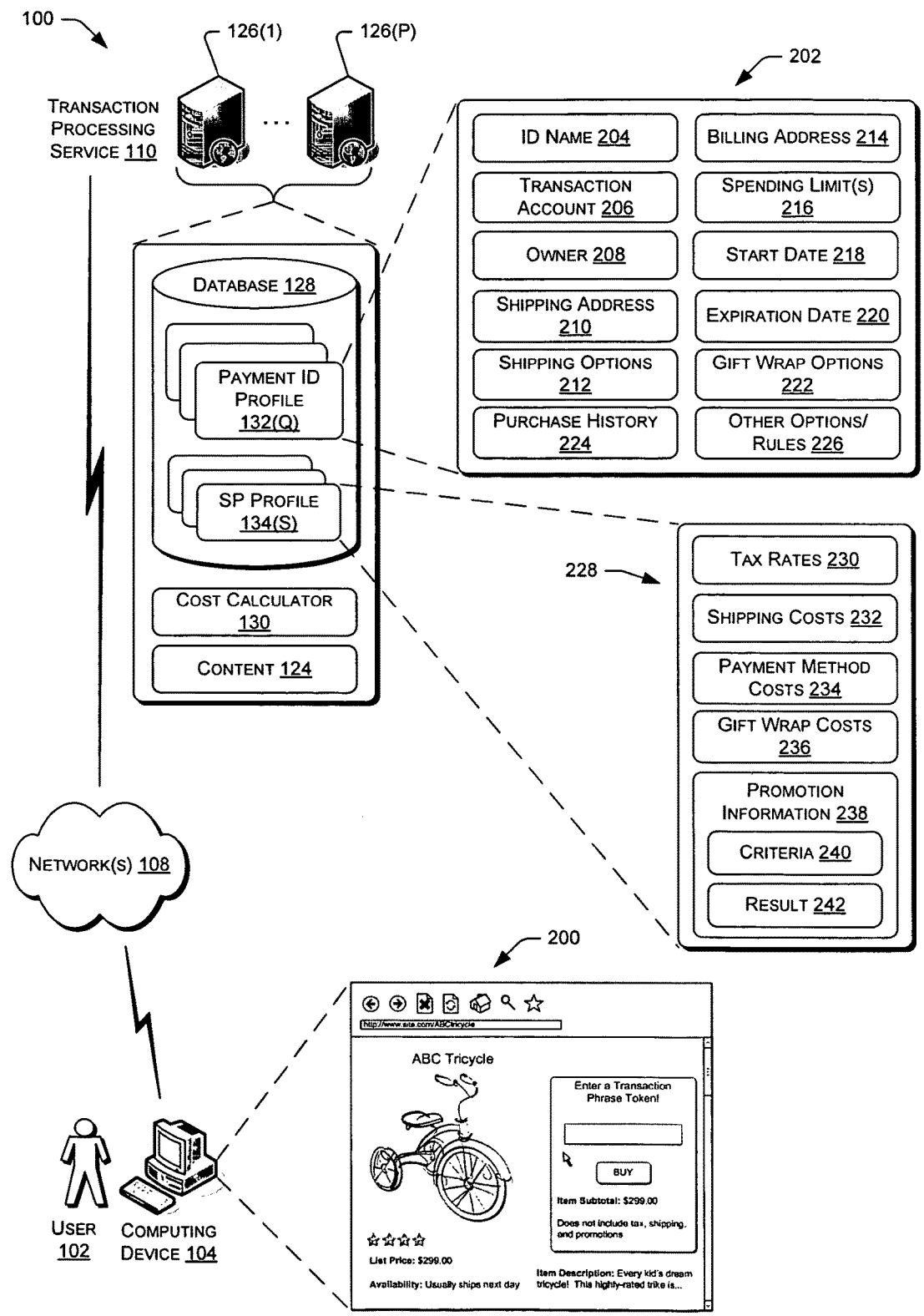
FIG. 2 illustrates example pieces of information that the transaction processing service of FIG. 1 may store or otherwise access.

FIG. 2 illustrates pieces of information that transaction processing service 110 of FIG. 1 stores or accesses, as well as an example page 200 served by site 106(1) and service 110. FIGS. 3-9 and an accompanying discussion illustrate and describe example page 200 below.

As illustrated, each of identifier profiles 132(1)-(Q) may include one or more pieces of information 202 about a corresponding payment identifier (e.g., a transaction phrase token, credit card number, bank account number, etc.). FIG. 2 illustrates example pieces of information 202 with reference to payment identifier profile 132(Q). As discussed above, cost calculator 130 may employ information 202 for the purpose of calculating a fully-landed cost for a particular item or items if the payment identifier corresponding to information 202 were used to purchase the particular item or items.

First, identifier profile 132(Q) may include a token name 204. In the example of a transaction phrase token, token name 204 may comprise a set of characters having a secondary meaning to an owner of the token. For instance, token name 204 may be "Ride On", "J's Spending $", "Grace's Textbooks", "Tanner and Griffin's Fun Money" or any other string of characters. Additionally, token name 204 may comprise a picture, sound, or other form of identifier. In instances where the corresponding token does not comprise a transaction phrase token, but rather comprises a credit card, gift card, bank account, or the like, token name 204 may be a number of the corresponding card or account.

Next, identifier profile 132(Q) may include an identification of an underlying transaction account 206. If the corresponding token comprises a credit card, gift account, bank account, or the like, then transaction account 206 may merely indicate this information (e.g., "MasterCard® Credit Card", "Bank of America® Checking Account", etc.). However, if the corresponding token comprises a transaction phrase token, then transaction account 206 may indicate the underlying transaction account or payment instrument associated with the token. For instance, using the example of the phrase token "Ride On", this token may be associated with a particular credit card. As such, transaction account 206 indicates the number, expiration date, and other details of this card. Again, transaction phrase tokens may be associated with any number of different types of underlying transaction accounts, such as credit or debit cards, gift cards, bank accounts, lines of credit, and the like.

Identifier profile 132(Q) may further include an indication of an owner 208 of the corresponding payment identifier. The indicated owner 208 may control the underlying transaction account 206, such as the credit card, gift card, or the like. Profile 132(Q) further includes a shipping address 210 associated with the identifier. When the identifier was created, a shipping address may have been included such that each order made with the token would result in shipment to shipping address 210 (unless otherwise specified). When a user, such as user 102, enters a payment identifier into page 200 in order to determine a fully-landed cost of an item or items, calculator 130 may determine shipping address 210 (in conjunction with information from service provider profile 134(S)) to determine a shipping cost for the item or items.

Similarly, payment identifier profile 132(Q) may include shipping options previously chosen (either explicitly or by default) for the corresponding token. For instance, shipping options 212 may specify that each order purchased with this token should be shipped overnight, via express mail, via ground, or the like. Furthermore, shipping options 212 may specify a combination thereof. Again, calculator 130 may look to shipping options 212 when calculating a fully-landed cost based on a particular payment identifier.

Next, identifier profile 132(Q) may include a billing address 214 associated with the payment identifier. Calculator 130 may analyze billing address 214 for the purpose of helping to determine a sales tax to apply to the fully-landed cost of the item or items. For instance, payment identifiers (e.g., transaction phrase tokens, etc.) associated with a billing address in a first state may be subject to a first percentage sales tax (e.g., 8%), while payment identifiers associated with a billing address in a second different state may be subject to a second different sales tax (e.g., 6%) or no sales tax at all.

Identifier profile 132(Q) may also include one or more spending limits 216. For instance, a transaction phrase token may have a lifetime limit of a particular amount (e.g., $500). The transaction phrase token may also have periodic limits (e.g., daily limit, weekly limit, monthly limit, etc.) Calculator 130 may reference spending limits 216 when making a determination as to whether an item may be purchased with a received transaction phrase token. If, for instance, calculator 130 determines that the received transaction phrase token has already reached its allowable spending limit 216, then service 110 may provide this indication (or some sort of transaction-denial notification) to service provider site 106(1) and/or device 104.

Next, a payment identifier may have a time range in which the identifier is valid and may be employed for the purpose of conducting transactions. Therefore, profile 132(Q) includes a start date 218 and an expiration date 220. Start date 218 represents a point in time in which the corresponding identifier becomes valid for use. If service 110 receives a request for a fully-landed cost based on a payment identifier that has yet to hit start date 218, then service 110 may provide an indication that the transaction cannot take place. In some instances, service 110 may additionally provide the fully-landed cost while noting that the token cannot yet be used to make the purchase at the current time. Similarly, profile 132(Q) includes an expiration date 220, after which point a corresponding token is expired and may not be used. Again, service 110 may provide an indication of this expiration to service provider site 106(1) and/or device 104 in response to receiving a payment identifier for the purpose of determining a fully-landed item cost.

FIG. 2 further illustrates that profile 132(Q) may also include gift wrap options 222. Again, an owner of the token may have previously chosen certain options relating to gift wrapping. For instance, an owner may have requested that each item ordered with the particular token should automatically be gift wrapped. As such, calculator 130 may employ this information in unison with information provided by the service provider for the purpose of including the gift-wrap cost into the fully-landed cost presented to user 102.

In some instances, identifier profile 132(Q) may also include a purchase history 224 of the corresponding payment identifier and/or of owner 208 generally. Calculator 130 may employ purchase history 224 when determining whether a particular transaction is eligible for an offered promotion. For instance, envision that service provider site 106(1) informs service 110 that users who make three purchases from site 106(1) within a predetermined time period (e.g., within the last month) are eligible for a particular promotion (e.g., free shipping). Service 110 may accordingly access purchase history 224 in order to determine if the payment identifier has been used the requisite number of times within the predetermined period. If so, then service 110 may factor this promotion into the provided fully-landed cost. Similarly, if the customer would be eligible for a discount based on the payment method associated with the transaction phrase token, such discount may also be reflected in the fully-landed cost.

Finally, FIG. 2 illustrates that an identifier profile may include many other options and rules 226. For instance, a transaction phrase token (or another type of payment identifier) may limit transactions to a certain category or categories of items (e.g., only textbooks, etc.), to items have certain ratings (e.g., movies rated "G" or "PG"), to a set one or more service providers or one or more classes of service providers, and/or may employ any other type of rule. Calculator 130 may use each of these rules when determining whether a payment identifier may be used to purchase a particular item or items, as well as when determining a fully-landed cost of allowed purchases.

FIG. 2 also illustrates information 228 provided by an illustrative service provider profile 134(S) corresponding to a particular service provider, such as service provider site 106(1). Again, calculator 130 may employ information 228 when determining whether a particular payment identifier may be used to purchase a particular item or items and/or when calculating a fully-landed cost for the item or items.

As illustrated, information 228 includes tax rates 230. Tax rates 230 may indicate the tax rates applicable to different states, countries, and the like. For instance, tax rates 230 for this particular service provider profile 134(S) may indicate that purchasers from a certain state have to pay that state's sales tax, while purchasers from other states may not need to pay a sales tax at all. When service 110 receives a payment identifier for the purpose of providing a fully-landed cost to a user, calculator 130 may access billing address 214 and may compare this information to tax rates 230. Calculator 130 may then determine a corresponding tax for the current item or items relating to the request for the fully-landed cost.

Profile 134(S) also indicates shipping costs 232 for different items and for different locations around the country or world. That is, this service provider may charge different shipping rates based on the purchased item or items and based on a location of the purchaser. Again, calculator 130 may compare this information with a particular shipping address 210 to determine a shipping cost. Additionally, profile 134(S) may include an indication 234 of how prices may fluctuate based on a chosen payment method. For instance, the service provider may apply a discount for a purchaser who employs a payment identifier that is associated with a bank account rather than a credit card. Calculator 130 therefore compares indication 234 with an underlying transaction account 206 to determine if a discount (or surcharge) should be included in the fully-landed cost.

Next, profile 134(S) includes information about gift wrap costs 236. By including gift wrap costs 236, calculator 130 may be able to better determine a fully-landed cost for a payment identifier that specifies that some or all items should be gift-wrapped by the service provider before they are shipped. Finally, service provider profile 134(S) includes promotion information 238. Here, the service provider supplies both criteria 240 for a user and/or item to qualify for a promotion, as well as the result 242 of the promotion. For instance, criteria 240 and result 242 may combine to specify that if a particular user purchases a certain number of items within a month, then that user's next purchase receives 10% off. Alternatively, criteria 240 and result 242 may combine to specify that if a particular order is over a particular amount, then that order is to receive 5% off. Of course, it is to be appreciated that these promotion examples are merely illustrative, and multiple other promotions may be employed.

In sum, FIG. 2 illustrates example information that both token profiles 132(1)-(Q) and service provider profiles 134(1)-(S) may include. Both of these sets of profiles may be used for the purpose of determining whether a specified item or items may be purchased with a specified payment identifier and, if so, what the fully-landed cost will be if the specified payment identifier is used to make the purchase. Each of these determinations may be made and provided to device 104 for rendering to user 102 without requiring that user 102 prove that the user owns or has control of the specified payment identifier. As such, user 102 is able to easily determine a fully-landed cost of an item for one or more payment identifiers without having to complete the step of authenticating for each token. Instead, user 102 may determine the fully-landed cost for each payment identifier he or she desires and may delay authentication until the user has fully decided to purchase the item or items.

Illustrative User Interfaces

FIG. 3 illustrates an example screen rendering of page 200 served by service provider site 106(1) of FIG. 1. Here, page 200 includes content 302 served by service provider site 106(1) as well as a widget 304 whose content is served by transaction processing service 110. Here, widget 304 allows the user to enter a payment identifier for the purpose of engaging in a transaction with service provider site 106(1). For instance, user 102 may enter a transaction phrase token into widget 304 for the purpose of determining whether the item may be purchased with the token. If so, user 102 may also learn of a fully-landed cost for the entered payment identifier without authenticating his or herself.

While illustrated widget 304 functions to determine a fully-landed cost for a single illustrated item, it is specifically noted that the described techniques may be applied for multiple items. For instance, the techniques described above and below are equally applicable to a widget that calculates a fully-landed cost for all items in a user's shopping cart or the like.

Content 302 includes an illustration of an "ABC Tricycle" 306 for sale by service provider site 106(1). While content 302 illustrates a tricycle, content 302 could similarly illustrate one or more alternative or additional items for sale or consumption. Content 302 further includes details 308 about tricycle 306. Details 308 include a rating 310 of the tricycle, a price 312 of the tricycle, availability 314 of the tricycle, and a description 316 of the tricycle. Of course, it is to be appreciated that details 308 are included for context only and that other implementations may employ more or less information than the illustrated implementation.

Widget 304, meanwhile, includes a text box 318 and an icon 320 entitled "Buy". Text box 318 allows a user, such as user 102, to enter a payment identifier into this field. Once a payment identifier is entered, user 102 may then select icon 320 (e.g., with a cursor 322) to request to purchase tricycle 306 from service provider site 106(1). In the illustrated example, this request and corresponding payment identifier may be submitted to transaction processing service 110.

Before user 102 sends a request to purchase an item, however, user 102 may determine a fully-landed cost for doing so. FIG. 3 illustrates widget 304 at a time before user 102 has entered a payment identifier into text box 318. At this point, widget 304 illustrates an item subtotal 324 ($299.00). As illustrated, item subtotal 324 "does not include tax, shipping, and promotions", as this information may be dependent upon the actual payment identifier entered into box 318.

Figure 4:
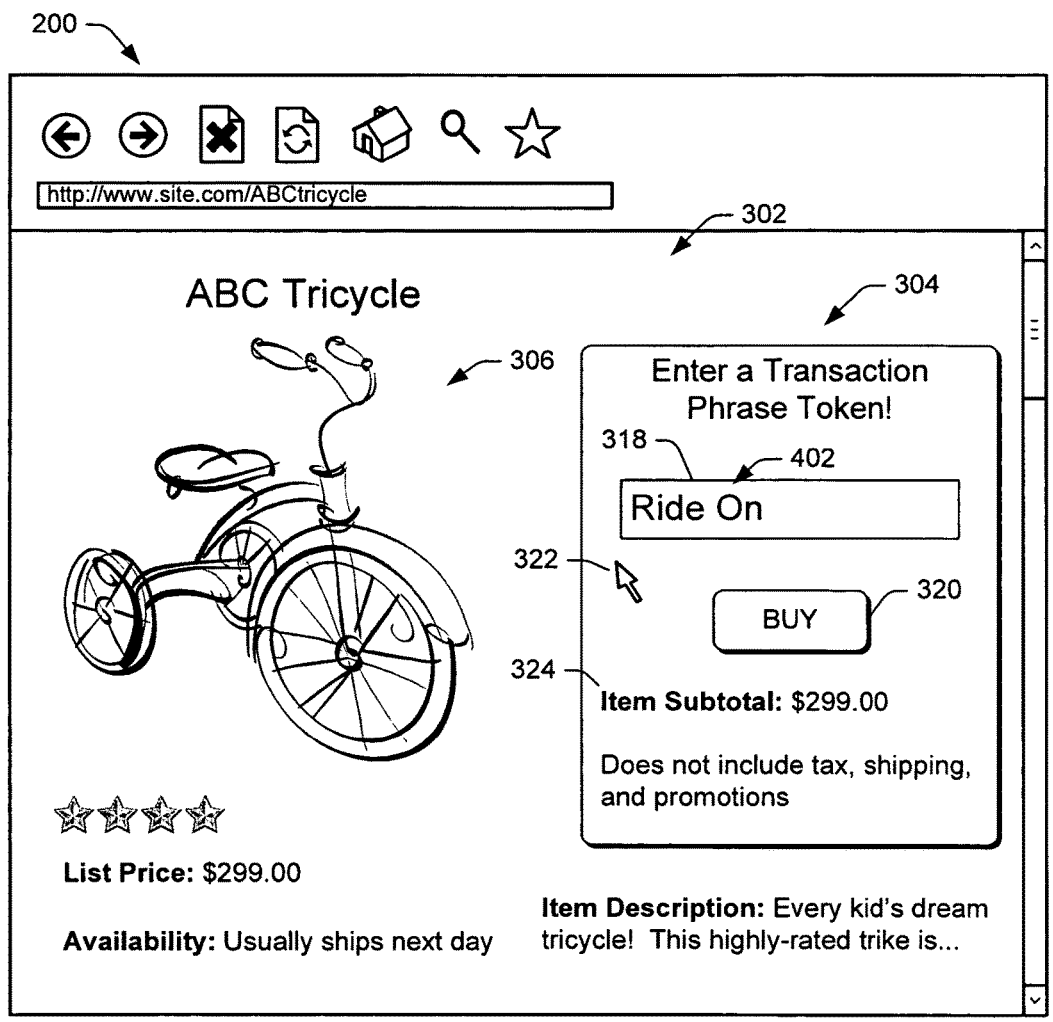
FIG. 4 illustrates the example screen rendering of the page from FIG. 3 as the user has enters a payment identifier into a text box of the widget. Here, the user enters a type of identifier labeled a "transaction phrase token" into the text box.

FIG. 4 illustrates page 200 just after user 102 enters a payment identifier 402 ("Ride On") into text box 318. FIG.

5, meanwhile, illustrates page 200 after user 102 has finished entering token 402 and after service 110 has processed information regarding the potential transaction. As illustrated, calculator 130 of service 110 has calculated a total price 502 of $376.97 if user 102 were to purchase tricycle 306 with transaction phrase token 402 entitled "Ride On". Widget 304 here indicates that price 502 "includes tax, shipping, and promotions". Note that user 102 was able to view fully-landed cost 502 merely by entering transaction phrase token 402 into text box 318 and without having to authenticate his or herself. Finally, note that widget 304 also includes a link 504 that, when selected, allows user 102 to "see complete purchase details". That is, selection of link 504 allows user 102 to view a breakout of fully-landed cost 502.

As discussed above, total price 502 may be based on a number of factors associated with transaction phrase token 402 and details about the item(s) being offered for sale. For instance, token 402 may be associated with a particular shipping address 210. Furthermore, service provider site 106(1) may employ varying shipping costs 232 based on varying shipping addresses. As such, calculator 130 likely compared this information in determining a cost to ship tricycle 306 to user 102 (or to shipping address 210).

Similarly, token 402 may be associated with a particular billing address 214, while service provider site 106(1) may be associated with particular tax rates 230. Calculator 130 may therefore have compared this information in determining a sales tax portion of total price 502.

Furthermore, calculator 130 may have analyzed gift wrap options 222 of user 102 and gift wrap costs 236 of service provider site 106(1). Calculator 130 may also have analyzed promotion information 238 associated with service provider site 106(1), as well as a purchase history 224 of user 102 in determining whether a promotion applies to total price 502. In some instances, service 110 maintains purchase history 224 for the purpose of determining whether a transaction phrase token or other payment identifier qualifies for a promotion, while in other instances site 106(1) may track this purchase history.

It is also specifically noted that while calculator 130 may calculate a particular fully-landed cost, service provider site 106(1) may override this calculation in some instances. For instance, even if a user doesn't qualify for a promotion, site 106(1) may still offer the promotion for the purpose of increasing the chance of selling the item.

Figure 6:
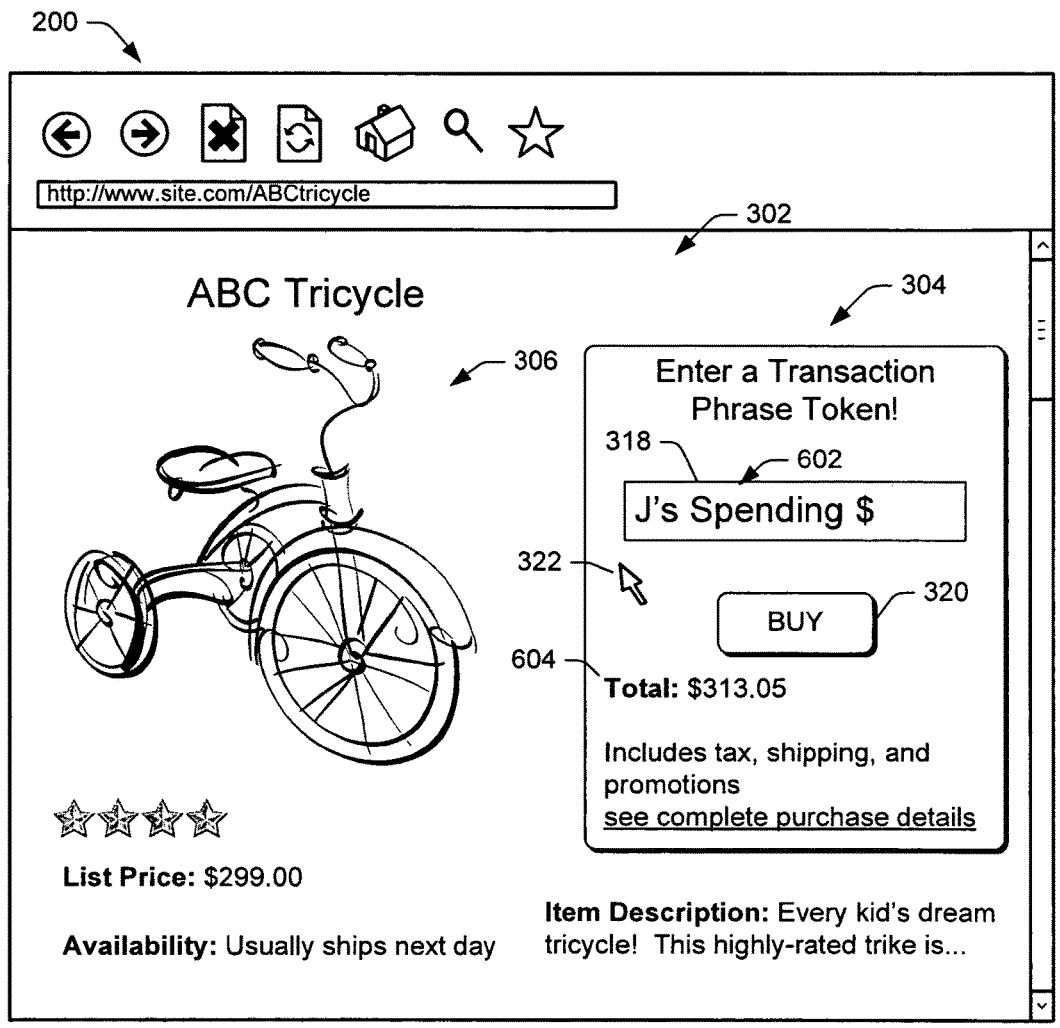
FIG. 6 illustrates the example screen rendering of the page from FIGS. 3-5 after the user has entered a different transaction phrase token into the text box. In response, the transaction processing service again provides (and the widget displays) a fully-landed cost of the illustrated item if the user were to purchase the item with this different transaction phrase token. Again, note that the user has yet to authenticate herself or this new token.

FIG. 6 illustrates page 200 after user 102 enters a different transaction phrase token 602 ("J's Spending $") into text box 318. Here, service 110 has calculated (and widget displays) a new total price 604 $313.05. Again, total price 604 is based on the tax, shipping, and any promotional discounts available.

Figure 5:
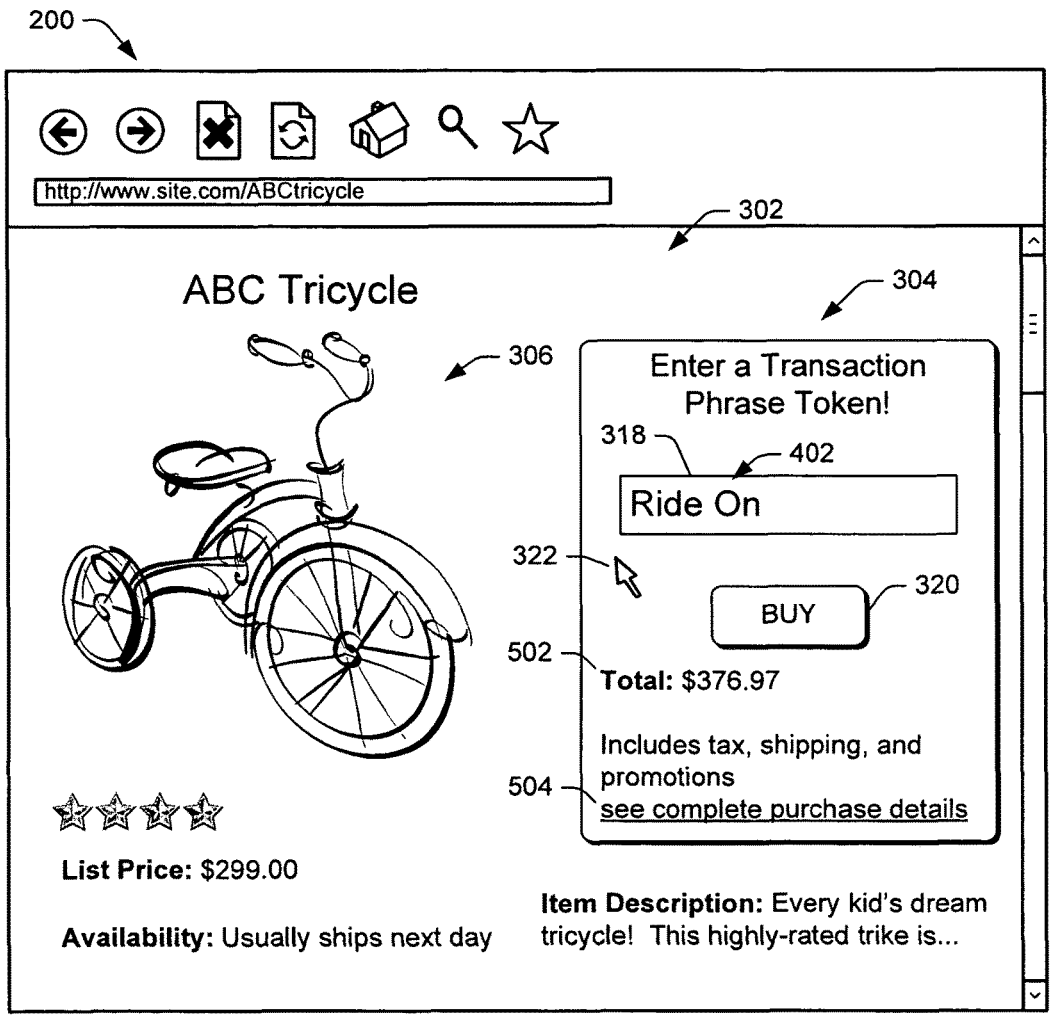
FIG. 5 illustrates the example screen rendering of the page from FIGS. 3 and 4 after the user has entered a transaction phrase token into the text box. Here, the transaction processing service provides (and the widget displays) a fully-landed cost of the illustrated item if the user were to purchase the item with the entered transaction phrase token. Note that the user has yet to authenticate herself or the token at this point.
Figure 7:
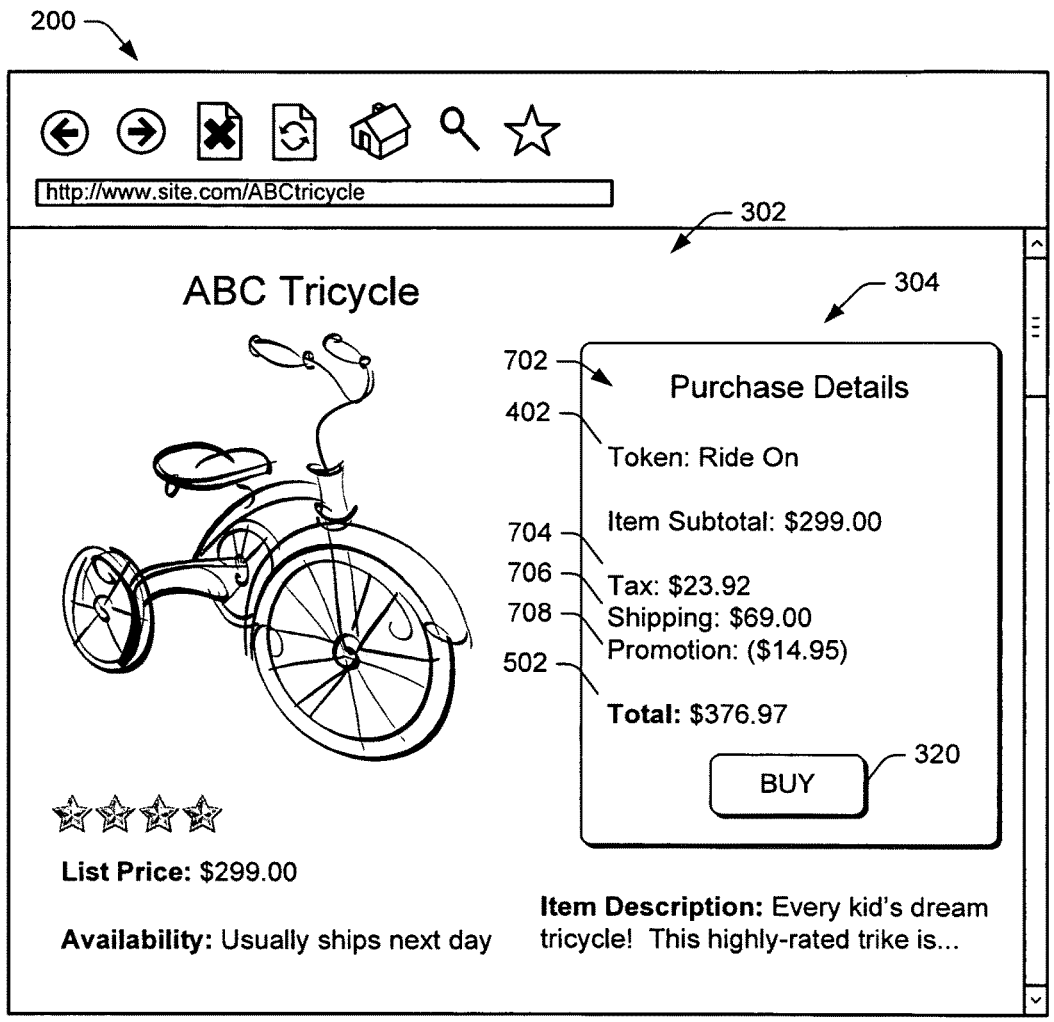
FIG. 7 illustrates a broken-out fully-landed cost for the token entered by the user in FIGS. 4-5. Here, the fully-landed cost is shown to include tax, shipping, and a promotion or discount.

Next, FIG. 7 illustrates page 200 after user 102 has selected link 504 from FIG. 5. In response, widget 304 displays a broken-out cost 702 of fully-landed cost 502 associated with token 402 ("Ride On"). As illustrated, broken-out cost 702 includes a tax cost 704 ($23.92), a shipping cost 706 ($68.00), and a promotion discount 708 (−$14.95). Here, tax cost 704 comprises 8% of the item sub-total and is likely based on a billing address associated with token 402. Similarly, shipping cost 706 is based on the shipping address associated with token 402. Promotion discount 708, meanwhile, corresponds to a 5% discount since the item sub-total is greater than $250. Of course, while this example promotion offers 5% off of any order greater than $250, site 106(1) could alternatively or additionally provide any other type of promotion.

Figure 8:
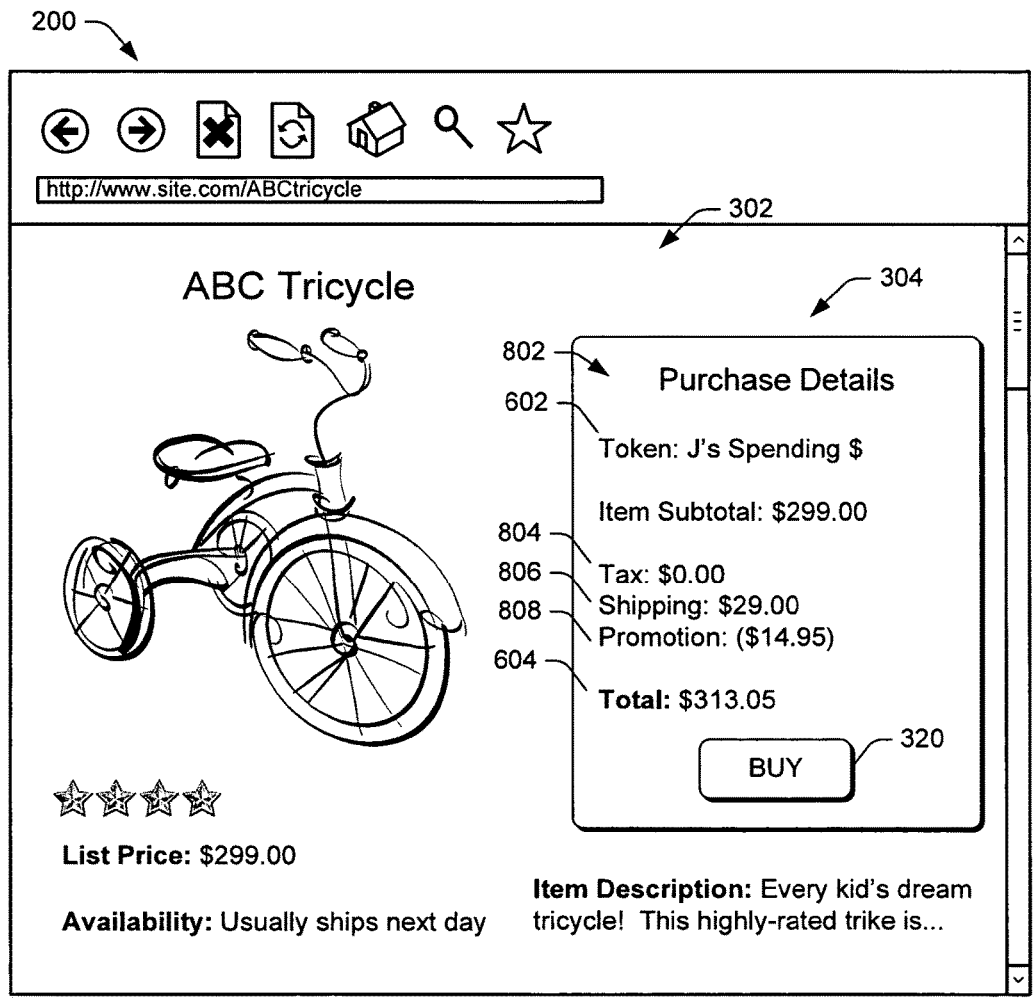
FIG. 8 illustrates a broken-out fully-landed cost for the token entered by the user in FIG. 6. Again, this fully-landed cost is shown to include tax, shipping, and a promotion or discount.

FIG. 8, meanwhile, illustrates page 200 after user 102 has selected to view a broken-out cost 802 for transaction phrase token 602 ("J's Spending $"). Again, broken-out cost 802 includes a tax cost 804 ($0), a shipping cost 806 ($29.00), and a promotion discount 808 (−$14.95). Here, the billing address associated with token 602 apparently does not result in any sales tax when compared with tax rate information of service provider site 106(1). Further, the shipping address associated with token 602 appears to correspond to a location that is much easier to ship to than is the shipping address of the first token 402. Finally, because promotion discount 708 was based on a subtotal of the item rather than token-specific information, promotion discount 808 remains the same as promotion discount 708.

Figure 9:
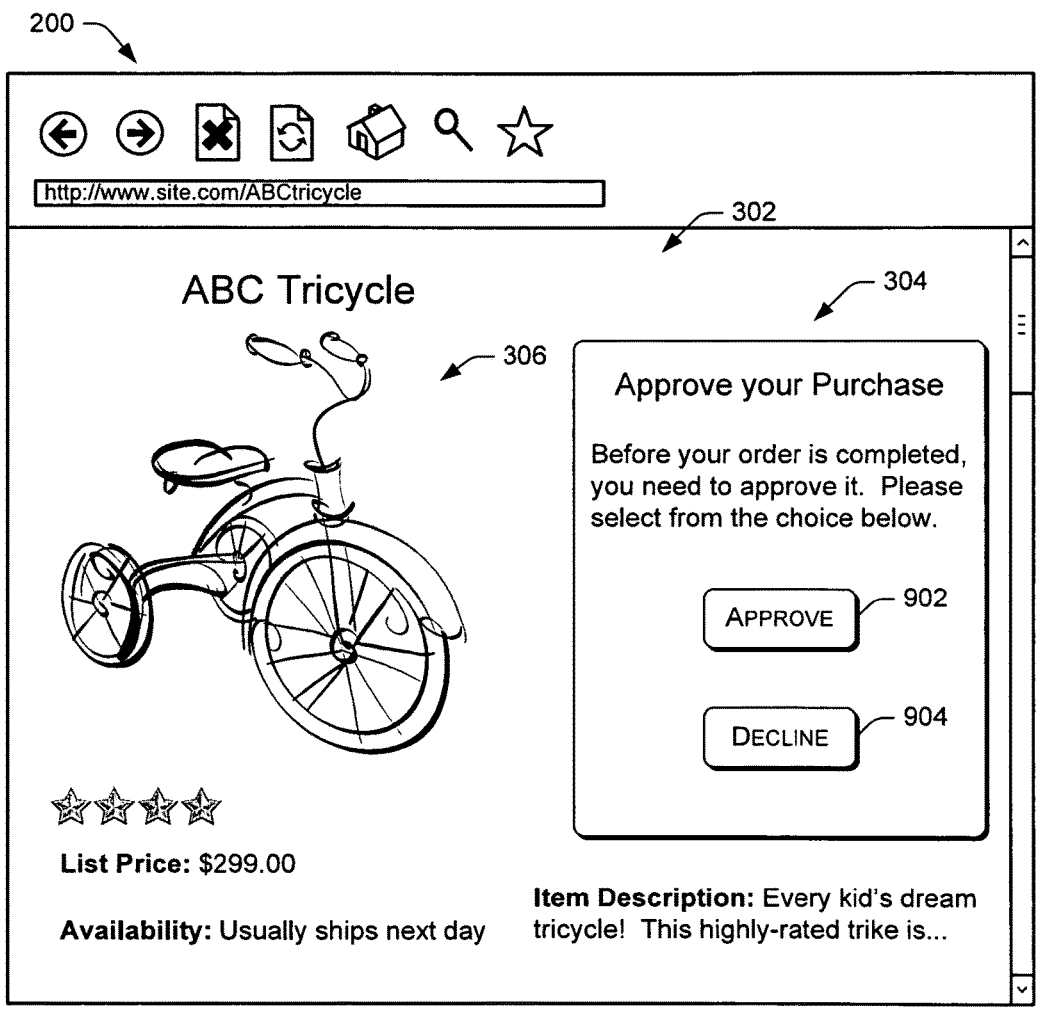
FIG. 9 illustrates an example screen rendering after the user has elected to purchase the item with one of the employed transaction phrase tokens. As FIG. 9 illustrates, the user must approve the requested purchase in order to finalize the order.

Next, FIG. 9 illustrates page 200 after user 102 has selected to purchase tricycle 306 with one of tokens 402 and 602. As discussed above, user 102 previously viewed fully-landed costs 502 and 604 without having to authenticate his or herself. Therefore, widget 304 here includes an icon 902 (entitled "Approve") that, when selected, attempts to approve the requested transaction. At this point, user 102 will likely need to authenticate his or herself in order to prove that he or she has authority purchase tricycle 306 with token 402 or 602. If successful, then the underlying transaction account associated with the employed transaction phrase token will be charged and service provider site 106(1) will ship tricycle 306 to user 102. Finally, widget 304 also provides an icon 904 (entitled "Decline") that, when selected, declines or voids the requested transaction.

Illustrative Flow Diagram

Figure 10:
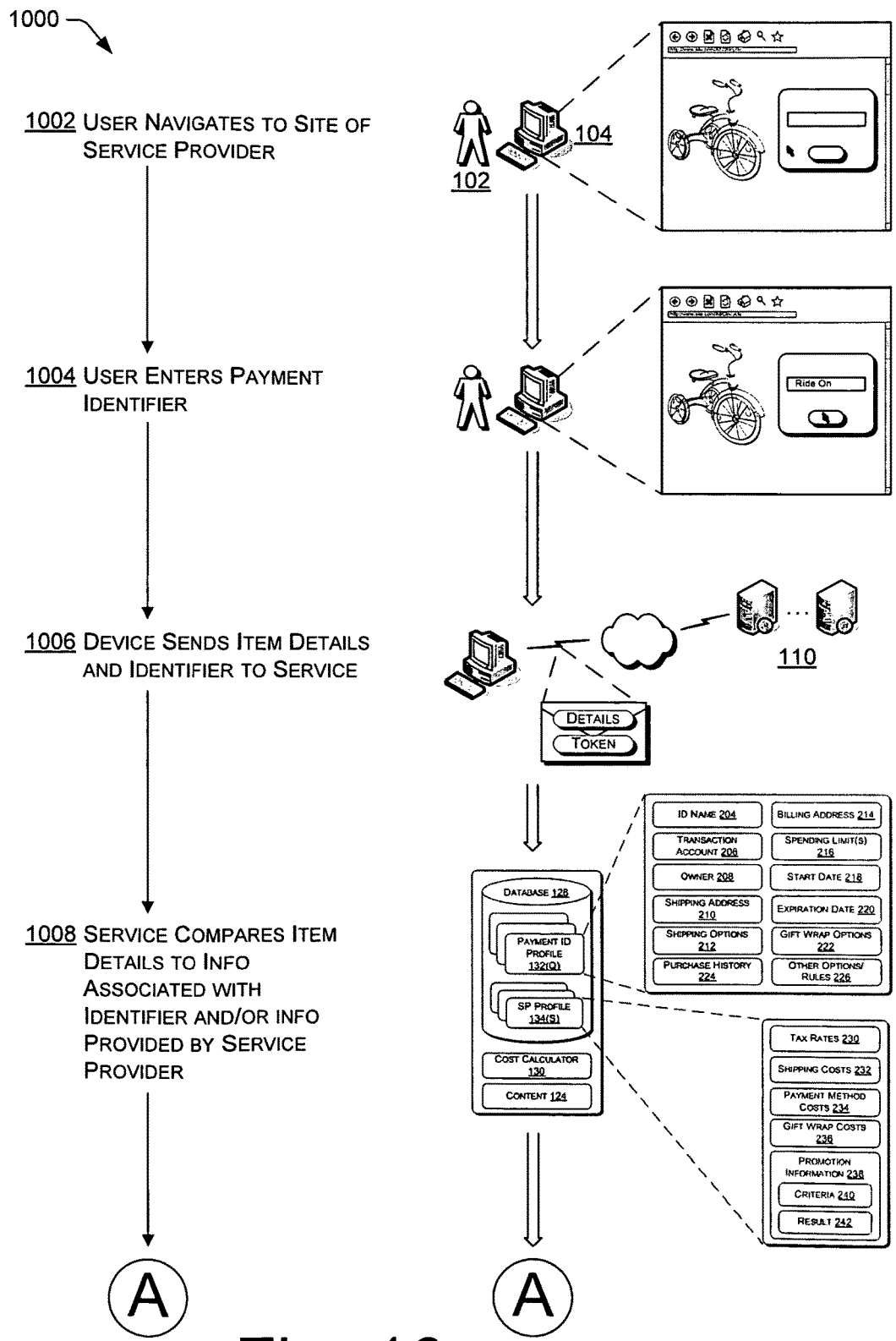
FIGS. 10-11 illustrate an example process that includes the user navigating to a site of a service provider and viewing a fully-landed cost of an item if a payment identifier such as a transaction phrase token is used. In this process, the user does not need to authenticate in order to view the fully-landed cost.
Figure 11:
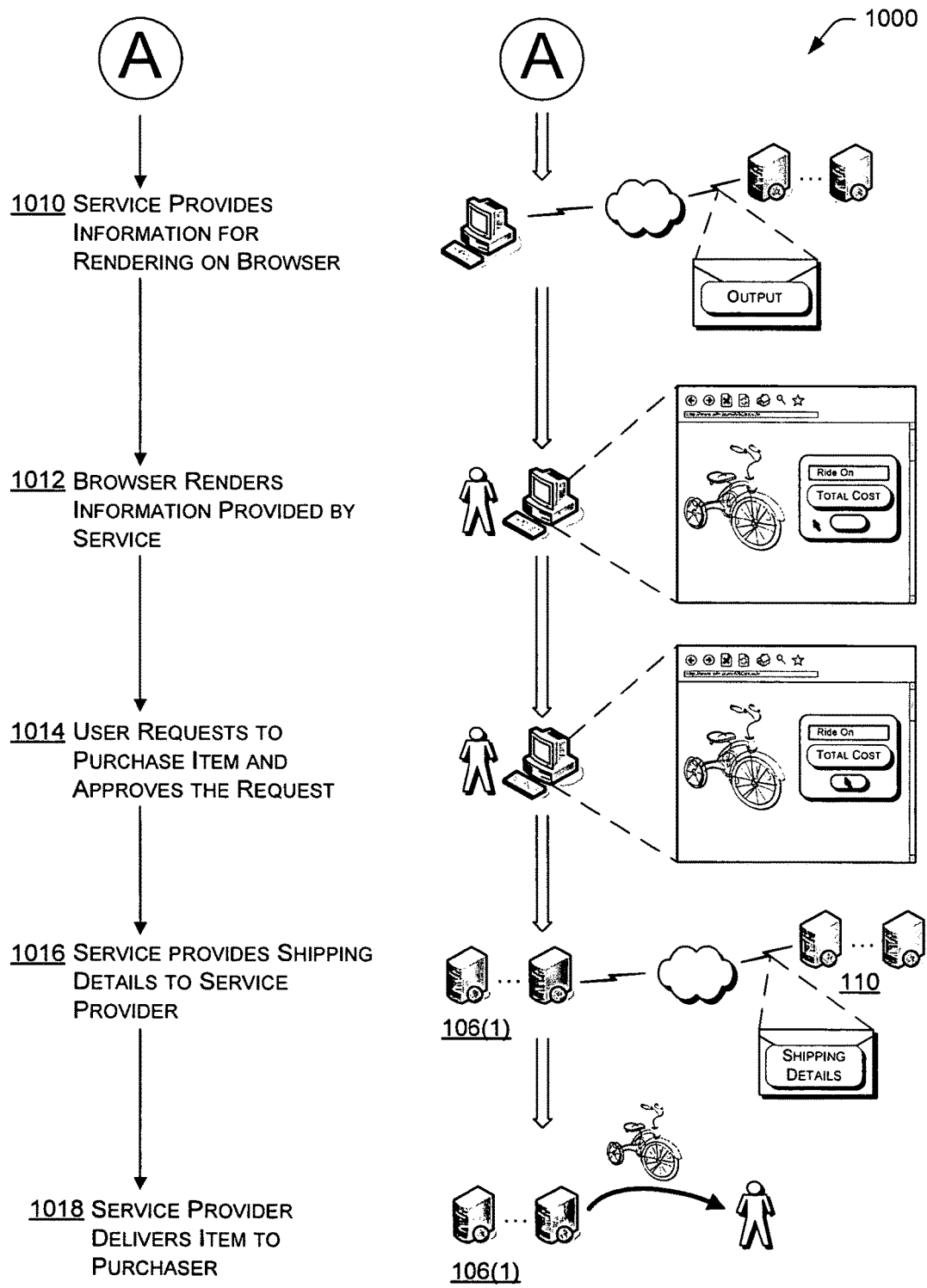

FIGS. 10-11 illustrate an example process 1000 that includes user 102 navigating to service provider site 106(1) and viewing a fully-landed cost of an item for a particular payment identifier. In this process, the user does not need to authenticate his or herself in order to view the fully-landed cost.

Process 1000 includes operation 1002, which represents user 102 employing computing device 104 to navigate to service provider site 106(1). While FIG. 10 illustrates the described techniques in the context of client-server navigation, it is again noted that the described techniques may be equally applicable in other contexts. Next, operation 1004 represents user 102 entering a payment identifier (e.g., a transaction phrase token "Ride On", a credit card number, etc.) into a widget or other tool provided by transaction processing service 110. By entering an identifier into this tool, user 102 may determine whether he or she can purchase the tricycle with the entered payment identifier. User 102 may additionally or alternatively determine an amount of a fully-landed cost if user 102 were to purchase the tricycle with the entered payment identifier.

Operation 1006, meanwhile, represents device 104 sending details about the tricycle as well as the entered transaction phrase token to transaction processing service 110. At operation 1008, service 110 compares the received item details to information associated with the received identifier (e.g., identifier token profile 132(Q)) as well as information provided by the service provider (e.g., service provider profile 134(S)). For instance, service 110 may compare the item details and service provider information to rules associated with the received identifier for purposes of determining whether these rules allow the purchase of the tricycle from service provider site 106(1). If the rules do not allow for this purchase, then service 110 may provide an indication to device 104 that the tricycle cannot be purchased with the received payment identifier.

If the payment identifier may be used to purchase the tricycle, then service 110 may compare a shipping address associated with the identifier to shipping information provided by service provider site 106(1) as well as details about the tricycle. By doing so, service 110 may determine a shipping cost that would be charged if user 102 were to purchase the tricycle with the received payment identifier (here, transaction phrase token "Ride On"). Similarly, service 110 may compare a billing address associated with the payment identifier to tax rate information associated with service provider site 106(1) and the cost of the tricycle. By doing so, service 110 may determine an amount of sales tax that would be applied if user 102 were to purchase the tricycle with use of the identifier. Finally, service 110 may also compare the item details and service provider information to information associated with the received identifier for purposes of determining whether a promotional discount would apply to the purchase.

FIG. 11 continues the illustration of process 1000, and includes operation 1010. Here, service 110 provides some sort of information for output to user 102 or to another entity. Here, service provides this information to device 104 for rendering on browser 116. This information may comprise, for instance, an indication that the received transaction phrase token "Ride On" cannot be used to purchase the tricycle. In some instances, service 110 may provide a reason as to why the token or other identifier cannot be used (e.g., expired token, above the spending limit, etc.), while service 110 may not reveal this information in other instances. Alternatively, this information may comprise a fully-landed cost for purchasing the tricycle with the provided token or other identifier. Whatever the information, browser 116 renders the provided information at operation 1012. In the current example, service 110 provides and browser 116 renders a fully-landed cost of the tricycle for the "Ride On" transaction phrase token in the current example.

At operation 1014, user 102 requests to purchase the tricycle, authenticates him or herself (e.g., with a password or PIN associated with the token), and approves the requested purchase. At this point, service 110 charges the underlying transaction account (e.g., a credit card, gift card, bank account, etc.) and provides shipping details about the token to service provider 106(1) at operation 1016. Service provider site 106(1) then delivers the tricycle to user 102 (or, more specifically, to the shipping address associated with the transaction phrase token) at operation 1018. While the current example involves a physical item, other embodiments may comprise intangible or electronic items. In these instances, service provider 106(1) need not physically ship the items, but instead may deliver the items in other ways (e.g., downloads, streams, etc.).

Illustrative Processes

Figure 12:
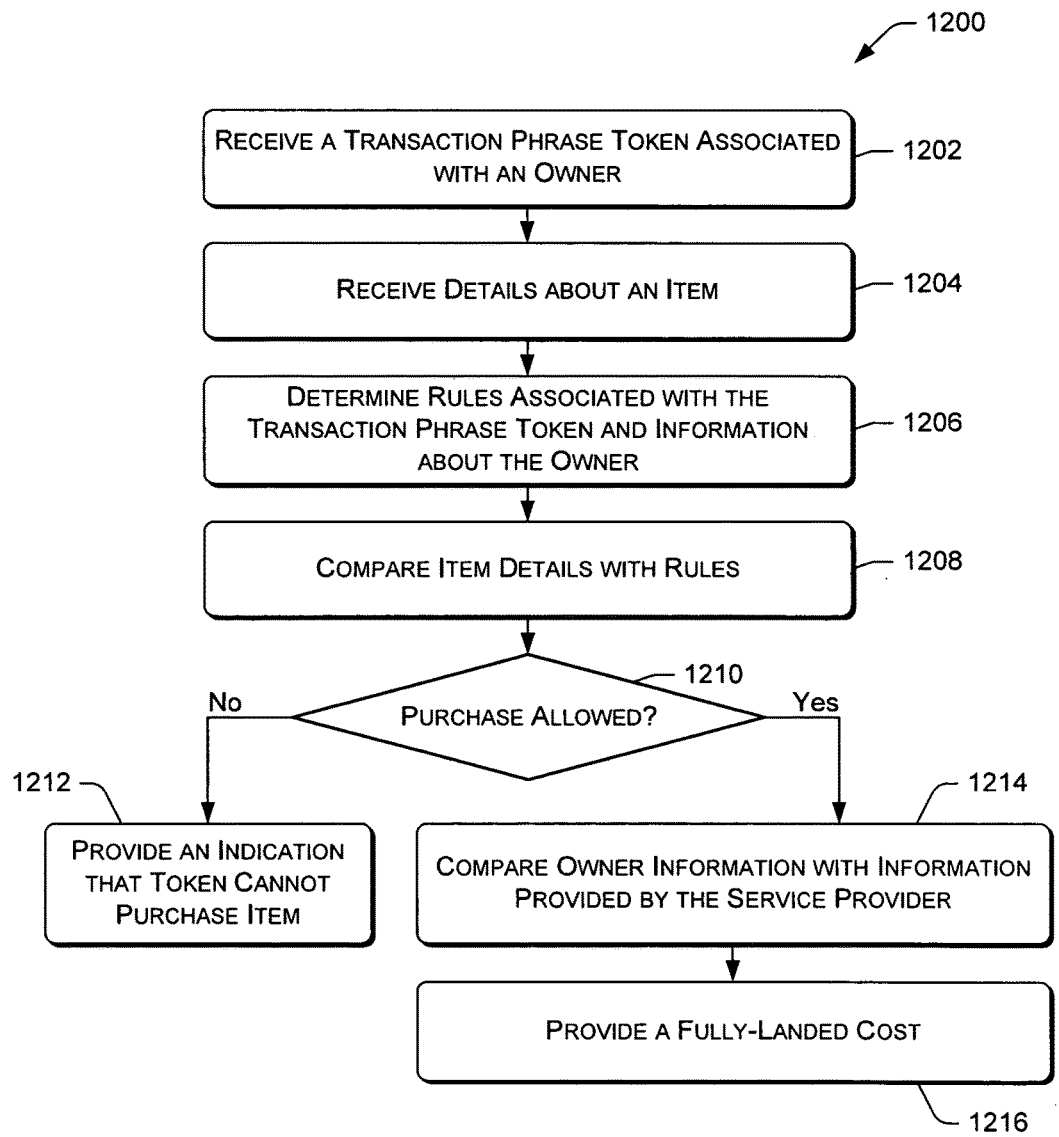
FIG. 12 is a flow diagram of an example process that may be implemented by the architecture of FIG. 1 and/or by other architectures.

FIG. 12 illustrates an example process 1200 that may be implemented by the architecture of FIG. 1 and/or by other architectures. This process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 1200 includes receiving, at operation 1202, a transaction phrase token associated with an owner. In some instances, the transaction phrase token comprises a set of characters having a secondary meaning to the owner of the token. Next, operation 1204 receives details about an item. Although the item may comprise an item for sale, it need not. Operation 1206, meanwhile, represents determining rules associated with transaction phrase token, as well as information about the owner. Operation 1208 then compares the item details with the rules associated with the transaction phrase token.

Next, decision block 1210 queries whether the purchase of the item is allowed based on the comparison of the item details and the rules. For instance, if the cost of the item exceeds a spending limit associated with the token, then block 1210 may deny the purchase. If block 1210 does indeed deny the request, then operation 1212 provides an indication stating that the token cannot purchase the item. In some instances, this may be provided to user 102.

If, however, the rules of the token allow the purchase, then operation 1214 compares owner information of the token with information provided by the service provider. For instance, operation 1214 may compare a shipping address of the owner with shipping rates of the service provider to determine a cost to ship the item to the specified address. Operation 1214 may also compare a billing address of the owner with tax rates specified by the service provider to determine a sales tax to apply to the cost of the item. Finally, operation 1216 provides a fully-landed cost, possibly for presentation to user 102 on browser 116.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
   a first server system that operates in a first network domain, wherein the first server system stores a database that maintains a plurality of payment identifier profiles associated with an owner, and a plurality of service provider profiles, individual payment identifier profiles of the plurality of payment identifier profiles including transaction account information of the owner; and
   a second server system that operates in a second network domain that is distinct from the first network domain, wherein the second server system hosts a service provider site of a service provider, the service provider site being configured to serve a page to a user device, the page including first content served by the first server system and second content served by the second server system, wherein the second content pertains to an item available for purchase via the service provider site in response to the site being accessed by the user device, and wherein the first content comprises a widget that allows a user of the user device to engage in a transaction with the service provider to consume or obtain the item;

wherein the first server system is configured with computer-executable instructions that are executable on one or more processors to:
provide a service for enabling users to engage in transactions on service provider sites outside the first network domain without having to create accounts with, and without having to supply the transaction account information to the service provider site;
respond to a browser request from the user device for the first content by returning the widget to the user device;
receive, from the second server system, information about the item;
receive, from the user device, a payment identifier associated with a payment identifier profile of the plurality of payment identifier profiles;
access, from the database and without authenticating the user, the payment identifier profile to determine a shipping option, a billing address, and a purchase history associated with the payment identifier;
access, from the database, a service provider profile of the plurality of service provider profiles that is associated with the service provider to determine a cost of the item, a shipping cost associated with the shipping option, a tax rate associated with the billing address, and promotion information;
determine broken-out costs associated with the payment identifier, the broken-out costs including:
the shipping cost;
a sales tax based at least in part on the tax rate and the cost of the item; and
a promotional discount based at least in part on the promotion information and the purchase history;
determine a fully-landed cost of the item based at least in part on the cost of the item and the broken-out costs;
respond to a browser request from the user device by returning to the user device, via the widget, an indication of the fully-landed cost of the item, the indication being made available without authenticating that the user of the user device is the owner of the payment identifier; and
in response to returning, to the user device, the indication of the fully-landed cost and in response to receiving an indication from the user device that approves a purchase of the item using the payment identifier, authenticate the user by determining that the user is the owner of the payment identifier.

2. A system as recited in claim 1, wherein returning the indication of the fully-landed cost further comprises providing the indication to a computing device of the service provider.

3. A system as recited in claim 1, wherein the payment identifier comprises a transaction phrase token associated with a payment instrument specified in the transaction account information, the transaction phrase token comprising a set of characters that has a secondary meaning to the owner.

4. A system as recited in claim 1, wherein determining the broken-out costs including the promotional discount comprises comparing (i) the purchase history associated with the payment identifier to (ii) the promotion information to determine whether the purchase history satisfies criteria specified in the promotion information.

5. A system as recited in claim 1, wherein the first server system is further configured to:

determine, from the payment identifier profile, rules associated with the payment identifier; and
determine that the payment identifier is useable to acquire the item based at least in part on a comparison of the rules with the information about the item.

6. A system as recited in claim 1, wherein the first server system is further configured to:
determine, from the payment identifier profile, rules associated with the payment identifier;
determining that the payment identifier is useable to acquire the item based at least in part on a comparison of the rules with the information about the item; and
providing, to the user device, an indication that the payment identifier is useable to acquire the item.

7. A system as recited in claim 5, wherein at least one of the rules limits an amount to be charged to a payment instrument specified in the transaction account information.

8. A system as recited in claim 5, wherein at least one of the rules limits purchases made with the payment identifier to one or more specified item categories.

9. A system as recited in claim 5, wherein at least one of the rules specifies a time range during which the payment identifier is useable.

10. A system as recited in claim 5, wherein at least one of the rules specifies the service provider or a class of service providers with which the payment identifier is useable to conduct transactions.

11. A system as recited in claim 1, wherein the fully-landed cost is further based on a gift wrapping cost for the items.

12. A system comprising:
a first server system that operates in a first network domain, wherein the first server system stores a database that maintains a plurality of payment identifier profiles associated with an owner, and a plurality of service provider profiles, individual payment identifier profiles of the plurality of payment identifier profiles including transaction account information of the owner; and
a second server system that operates in a second network domain that is distinct from the first network domain, wherein the second server system hosts a service provider site of a service provider, the service provider site being configured to serve a page to a user device, the page including first content served by the first server system and second content served by the second server system, wherein the second content pertains to an item available for purchase via the service provider site in response to the site being accessed by the user device, and wherein the first content comprises a widget that allows a user of the user device to engage in a transaction with the service provider to consume or obtain the item;
wherein the first server system comprises one or more processors and one or more computer-readable media storing:
the database; and
computer-executable instructions that, when executed on the one or more processors, are operable to:
provide a service for enabling users to engage in transactions on service provider sites outside the first network domain without having to create accounts with, and without having to supply the transaction account information to the service provider site;

respond to a browser request from the user device for the first content by returning the widget to the user device;

receive, from the second server system, information about the item in response to the service provider site being accessed by the user device;

receive a transaction phrase token from the user device, the transaction phrase token being associated with a payment identifier profile of the plurality of payment identifier profiles, the payment identifier profile including a payment instrument;

identify, in the payment identifier profile upon accessing the database, first information usable to determine a shipping cost, a sales tax, and a promotional discount;

identify, in a service provider profile of the plurality of service provider profiles that is associated with the service provider upon accessing the database, second information usable, in combination with the first information, to determine the shipping cost, the sales tax, and the promotional discount;

determine, based on the first information and the second information, the shipping cost, the sales tax and the promotional discount;

determine a fully-landed cost of the item based at least in part on a cost of the item, the shipping cost, the sales tax, and the promotional discount;

respond to a browser request from the user device by causing a display, via the widget, of an indication of the fully-landed cost of the item on the user device, the indication being displayed without authenticating that the user of the user device is the owner of the transaction phrase token; and in response to causing the display, on the user device, of the indication of the fully-landed cost and in response to receiving an indication from the user device that approves a purchase of the item using the transaction phrase token, authenticate the user by determining that the user is the owner of the transaction phrase token.

13. A system as recited in claim 1, wherein the payment identifier comprises a token identifier associated with the payment instrument, the token identifier comprising a sound.

14. A system as recited in claim 12, the computer-executable instructions, when executed on the one or more processors, are further operable to cause the indication of the fully-landed cost to be displayed on a computing device of the service provider.

15. A system as recited in claim 12, wherein the transaction phrase token comprises a set of characters that has a secondary meaning to the owner.

16. A system as recited in claim 12, wherein determining the promotional discount comprises comparing (i) a purchase history in the first information from the payment identifier profile to (ii) promotion information in the second information from the service provider profile to determine whether the purchase history satisfies criteria specified in the promotion information.

17. A system as recited in claim 12, the computer-executable instructions, when executed on the one or more processors, are further operable to:

determine, from the payment identifier profile, rules associated with the transaction phrase token; and determine that the transaction phrase token is useable to acquire the item based at least in part on a comparison of the rules with the information about the item.

18. A system as recited in claim 17, wherein at least one of the rules specifies the service provider or a class of service providers with which the payment identifier is useable to conduct transactions.

19. A system as recited in claim 12, wherein the fully-landed cost is further based on a gift wrapping cost for the item.

20. A method comprising:

operating a first server system in a first network domain to store a database that maintains a plurality of payment identifier profiles associated with an owner, and a plurality of service provider profiles, individual payment identifier profiles of the plurality of payment identifier profiles including transaction account information of the owner;

operating a second server system in a second network domain that is distinct from the first network domain, wherein the second server system hosts a service provider site of a service provider, the service provider site being configured to serve a page to a user device, the page including first content served by the first server system and second content served by the second server system, wherein the second content pertains to an item available for purchase via the service provider site in response to the site being accessed by the user device, and wherein the first content comprises a widget that allows a user of the user device to engage in a transaction with the service provider to consume or obtain the item;

providing, by the first server system, a service for enabling users to engage in transactions on service provider sites outside the first network domain without having to create accounts with, and without having to supply the transaction account information to the service provider site;

responding, by the first server system, to a browser request from the user device for the first content by returning the widget to the user device;

receiving, by the first server system from the second server system, information about the item accessed by the user device on the service provider site of the service provider;

receiving, by the first server system from the user device, a payment identifier that the user device provided via the site, the payment identifier being associated with a payment identifier profile of the plurality of payment identifier profiles;

accessing, by the first server system, the database to identify, from among the plurality of payment identifier profiles associated with the owner, the payment identifier profile;

identifying, by the first server system, in the payment identifier profile, first information usable to determine a shipping cost, a sales tax, and a promotional discount;

accessing, by the first server system, the database to identify, from among the plurality of service provider profiles, a service provider profile associated with the service provider;

identifying, by the first server system, in the service provider profile, second information usable, in combination with the first information, to determine the shipping cost, the sales tax, and the promotional discount;

determining, by the first server system, based on the first information and the second information, the shipping cost, the sales tax, and the promotional discount;

determining, by the first server system, a fully-landed cost of the item based at least in part on a cost of the item, the shipping cost, the sales tax, and the promotional discount;

responding, by the first server system, to a browser request from the user device by causing presentation, via the widget, of an indication of the fully-landed cost of the item on the user device, the indication being presented without authenticating that the user of the user device is the owner of the payment identifier; and in response to causing the presentation, on the user device, of the indication of the fully-landed cost and in response to receiving an indication from the user device that approves a purchase of the item using the payment identifier, authenticating, by the first server system, the user by determining that the user is the owner of the payment identifier.

21. A method as recited in claim 20, further comprising causing the indication of the fully-landed cost to be displayed on a computing device of the service provider.

22. A method as recited in claim 20, wherein the payment identifier comprises a transaction phrase token associated with a payment instrument, the transaction phrase token comprising a set of characters that has a secondary meaning to the owner.

23. A method as recited in claim 20, wherein determining the promotional discount comprises comparing (i) a purchase history in the first information from the payment identifier profile to (ii) promotion information in the second information from the service provider profile to determine whether the purchase history satisfies criteria specified in the promotion information.

24. A method as recited in claim 20, further comprising:
determining, from the payment identifier profile, rules associated with the payment identifier; and
determining that the payment identifier is useable to acquire the item based at least in part on a comparison of the rules with the information about the item.

25. A method as recited in claim 24, wherein at least one of the rules specifies the service provider or a class of service providers with which the payment identifier is useable to conduct transactions.

26. A method as recited in claim 20, wherein the fully-landed cost is further based on a gift wrapping cost for the item.

* * * * *